United States Patent
Kompella et al.

(10) Patent No.: US 10,355,997 B2
(45) Date of Patent: Jul. 16, 2019

(54) SYSTEM AND METHOD FOR IMPROVING TCP PERFORMANCE IN VIRTUALIZED ENVIRONMENTS

(71) Applicant: AppFormix, Inc., Sunnyvale, CA (US)

(72) Inventors: Ramana Kompella, Santa Clara, CA (US); Sumeet Singh, Saratoga, CA (US)

(73) Assignee: AppFormix Inc., San Jose, CA (US)

( * ) Notice: Subject to any disclaimer, the term of this patent is extended or adjusted under 35 U.S.C. 154(b) by 374 days.

(21) Appl. No.: 14/149,621

(22) Filed: Jan. 7, 2014

(65) Prior Publication Data
US 2015/0089500 A1    Mar. 26, 2015

Related U.S. Application Data

(60) Provisional application No. 61/882,768, filed on Sep. 26, 2013.

(51) Int. Cl.
| H04L 12/801 | (2013.01) |
| H04L 12/26 | (2006.01) |
| G06F 9/455 | (2018.01) |

(52) U.S. Cl.
CPC ........ *H04L 47/193* (2013.01); *G06F 9/45558* (2013.01); *H04L 43/18* (2013.01); *G06F 2009/45595* (2013.01)

(58) Field of Classification Search
CPC ... H04L 43/18; H04L 47/193; G06F 9/45558; G06F 2009/45595
See application file for complete search history.

(56) References Cited

U.S. PATENT DOCUMENTS

| D379,695 S | 6/1997 | Africa |
| 6,182,157 B1 | 1/2001 | Schlener et al. |
| 6,493,316 B1 | 12/2002 | Chapman et al. |
| 6,678,835 B1 | 1/2004 | Shah et al. |
| 6,741,563 B2 | 5/2004 | Packer |
| 6,754,228 B1 | 6/2004 | Ludwig |

(Continued)

FOREIGN PATENT DOCUMENTS

| CN | 102664786 A | 9/2012 |
| EP | 0831617 A2 | 3/1998 |

(Continued)

OTHER PUBLICATIONS

"U.S. Appl. No. 14/617,876, Preliminary Amendment filed Apr. 30, 2015", 48 pgs.

(Continued)

*Primary Examiner* — Mandish K Randhawa
(74) *Attorney, Agent, or Firm* — Shumaker & Sieffert, P.A.

(57) ABSTRACT

A method and system of improving TCP performance by offloading TCP processing to a protocol acceleration module is provided. For example, one or more in-sequence data packets being transmitted between a protocol sender and a protocol receiver is observed, and either the protocol sender or receiver resides within a virtualized host. A determination is made whether the protocol packet buffer within the protocol acceleration module is full. In further examples, one or more in-sequence packets are processed in an accelerated mode, where the processing includes copying the in-sequence data packets into the protocol packet buffer.

28 Claims, 13 Drawing Sheets

(56) References Cited

U.S. PATENT DOCUMENTS

| | | |
|---|---|---|
| 7,032,022 B1 | 4/2006 | Shanumgam et al. |
| 7,389,462 B1 | 6/2008 | Wang et al. |
| 7,433,304 B1 | 10/2008 | Galloway et al. |
| 7,802,234 B2 | 9/2010 | Sarukkai et al. |
| 8,102,881 B1 | 1/2012 | Vincent |
| 8,527,982 B1 | 9/2013 | Sapuntzakis et al. |
| 9,258,313 B1 | 2/2016 | Knappe et al. |
| 9,275,172 B2 | 3/2016 | Ostermeyer et al. |
| 9,319,286 B2 | 4/2016 | Panuganty |
| 9,385,959 B2 | 7/2016 | Kompella et al. |
| 9,641,435 B1 | 5/2017 | Sivaramakrishnan |
| 9,900,262 B2 | 2/2018 | Testa et al. |
| 9,906,454 B2 | 2/2018 | Prakash et al. |
| 9,929,962 B2 | 3/2018 | Prakash et al. |
| 9,940,111 B2 | 4/2018 | Labocki et al. |
| 2002/0031088 A1 | 3/2002 | Packer |
| 2004/0073596 A1 | 4/2004 | Kloninger et al. |
| 2004/0088412 A1 | 5/2004 | John et al. |
| 2005/0058131 A1 | 3/2005 | Samuels et al. |
| 2005/0091657 A1 | 4/2005 | Priem |
| 2006/0101144 A1 | 5/2006 | Wiryaman et al. |
| 2006/0259733 A1 | 11/2006 | Yamazaki et al. |
| 2006/0271680 A1* | 11/2006 | Shalev .................. H04L 69/163 709/225 |
| 2007/0014246 A1 | 1/2007 | Aloni et al. |
| 2007/0024898 A1 | 2/2007 | Uemura et al. |
| 2007/0248017 A1 | 10/2007 | Hinata et al. |
| 2008/0222633 A1 | 9/2008 | Kami |
| 2008/0250415 A1 | 10/2008 | Illikkal et al. |
| 2008/0253325 A1 | 10/2008 | Park et al. |
| 2008/0270199 A1 | 10/2008 | Chess et al. |
| 2008/0320147 A1 | 12/2008 | Delima et al. |
| 2009/0028061 A1 | 1/2009 | Zaencker |
| 2009/0172315 A1 | 7/2009 | Iyer et al. |
| 2009/0183173 A1 | 7/2009 | Becker et al. |
| 2010/0011270 A1* | 1/2010 | Yamamoto .............. H04L 47/10 714/748 |
| 2010/0095300 A1 | 4/2010 | West et al. |
| 2010/0125477 A1 | 5/2010 | Mousseau et al. |
| 2011/0128853 A1* | 6/2011 | Nishimura .............. H04L 47/10 370/235 |
| 2011/0276699 A1 | 11/2011 | Pedersen |
| 2012/0002669 A1* | 1/2012 | Dietterle ............... H04L 12/417 370/389 |
| 2012/0054330 A1* | 3/2012 | Loach ..................... H04L 47/17 709/224 |
| 2012/0054763 A1 | 3/2012 | Srinivasan |
| 2012/0096167 A1 | 4/2012 | Free et al. |
| 2012/0131225 A1* | 5/2012 | Chiueh .............. H04L 12/4633 709/246 |
| 2012/0210318 A1 | 8/2012 | Sanghvi et al. |
| 2012/0303923 A1 | 11/2012 | Behera et al. |
| 2012/0311098 A1 | 12/2012 | Inamdar et al. |
| 2012/0311138 A1 | 12/2012 | Inamdar et al. |
| 2013/0003553 A1 | 1/2013 | Samuels et al. |
| 2013/0042003 A1 | 2/2013 | Franco et al. |
| 2013/0044629 A1 | 2/2013 | Biswas et al. |
| 2013/0163428 A1 | 6/2013 | Lee et al. |
| 2013/0205037 A1 | 8/2013 | Biswas |
| 2013/0263209 A1 | 10/2013 | Panuganty |
| 2014/0007094 A1* | 1/2014 | Jamjoom ............ G06F 9/45533 718/1 |
| 2014/0019807 A1 | 1/2014 | Harrison et al. |
| 2014/0025890 A1 | 1/2014 | Bert et al. |
| 2014/0026133 A1 | 1/2014 | Parker |
| 2014/0067779 A1 | 3/2014 | Ojha et al. |
| 2014/0123133 A1 | 5/2014 | Luxenberg |
| 2014/0130039 A1 | 5/2014 | Chaplik et al. |
| 2014/0189684 A1 | 7/2014 | Zaslavsky et al. |
| 2014/0192639 A1 | 7/2014 | Smirnov |
| 2014/0241159 A1 | 8/2014 | Kakadia et al. |
| 2014/0258535 A1 | 9/2014 | Zhang |
| 2014/0304320 A1* | 10/2014 | Taneja .................. H04L 69/16 709/203 |
| 2014/0334301 A1 | 11/2014 | Billaud et al. |
| 2015/0067404 A1 | 3/2015 | Eilam et al. |
| 2015/0085665 A1 | 3/2015 | Kompella et al. |
| 2015/0089500 A1 | 3/2015 | Kompella et al. |
| 2015/0127912 A1 | 5/2015 | Solihin |
| 2015/0169306 A1 | 6/2015 | Labocki et al. |
| 2015/0215214 A1* | 7/2015 | Ng ........................ H04L 47/193 370/230 |
| 2016/0080206 A1 | 3/2016 | Prakash et al. |
| 2016/0080207 A1 | 3/2016 | Prakash et al. |
| 2016/0092257 A1 | 3/2016 | Wang et al. |
| 2016/0139948 A1 | 5/2016 | Beveridge et al. |
| 2016/0269302 A1 | 9/2016 | Kompella et al. |
| 2016/0277249 A1 | 9/2016 | Singh et al. |
| 2016/0366233 A1 | 12/2016 | Le et al. |
| 2016/0378519 A1 | 12/2016 | Gaurav et al. |
| 2017/0033995 A1 | 2/2017 | Banka et al. |
| 2017/0093918 A1 | 3/2017 | Banerjee et al. |
| 2017/0094377 A1 | 3/2017 | Herdrich et al. |
| 2017/0116014 A1 | 4/2017 | Yang et al. |
| 2017/0160744 A1 | 6/2017 | Chia et al. |
| 2017/0171245 A1 | 6/2017 | Lee et al. |
| 2017/0235677 A1 | 8/2017 | Sakan |
| 2017/0262375 A1 | 9/2017 | Jenne et al. |
| 2018/0088997 A1 | 3/2018 | Min |
| 2018/0097728 A1 | 4/2018 | Reddy et al. |
| 2018/0300182 A1 | 10/2018 | Hwang et al. |

FOREIGN PATENT DOCUMENTS

| | | |
|---|---|---|
| EP | 2687991 A2 | 1/2014 |
| WO | 2009089051 A2 | 7/2009 |
| WO | 2013101843 A2 | 7/2013 |
| WO | 2013184846 A1 | 12/2013 |
| WO | WO-2015048326 A1 | 4/2015 |

OTHER PUBLICATIONS

"U.S. Appl. No. 14/619,008, Preliminary Amendment filed Apr. 30, 2015", 4 pgs.

"International Application Serial No. PCT/US2014/057514, International Search Report dated Dec. 31, 2014", 2 pgs.

"International Application Serial No. PCT/US2014/057514, Written Opinion dated Dec. 31, 2014", 10 pgs.

Gamage, Sahan, et al., "Opportunistic flooding to improve TCP transmit performance in virtualized clouds", Proceedings of the 2nd ACM Symposium on Cloud Computing, (Oct. 26, 2011).

Gamage, Sahan, et al., "Protocol Responsibility Offloading to Improve TCP Throughput in Virtualized Environments", ACM Transactions on Computer Systems, 31(3) Article 7, (Aug. 2013), 7:1-7:34.

Kangarlou, Ardalan, et al., "vSnoop: Improving TCP Throughput in Virtualized Environments via Acknowledgement Offload", International Conference for High Performance Computing, Networking, Storage and Analysis (SC), (Nov. 2010), 1-11.

Klien, Thierry E., et al., "Improved TCP Performance in Wireless IP Networks through Enhanced Opportunistic Scheduling Algorithms", IEEE Global Telecommunications Conference, vol. 5, (2004), 2744-2748.

Office Action for U.S. Appl. No. 14/290,509, dated Nov. 10, 2015, 24 pages.

Notice of Allowance for U.S. Appl. No. 14/290,509, dated Mar. 9, 2016, 10 pages.

"Transmission Control Protocol," DARPA Internet Program Protocol Specification, Sep. 1981, RFC 793, 90 pp.

International Preliminary Report on Patentability from International Application No. PCT/US2014/057514, dated Mar. 29, 2016, 11 pp.

International Search Report and Written Opinion for PCT Application Serial No. PCT/US16/42606, dated Sep. 30, 2016, 12 pages.

Extended Search Report from counterpart European Application No. 14847344.0, dated May 2, 2017, 8 pp.

Response to Extended European Search Report dated May 2, 2017, from counterpart European Application No. 4847344.0, filed Nov. 17, 2017, 19 pp.

(56) References Cited

OTHER PUBLICATIONS

Office Action from U.S. Appl. No. 15/084,927, dated Jun. 12, 2018, 12 pp.
Notice of Allowance from U.S. Appl. No. 15/162,589, dated Jun. 22, 2018, 7 pp.
Response to Extended Search Report dated Jan. 5, 2018, from counterpart European Application No. 17163963.6, filed Jul. 31, 2018, 16 pp.
"OpenStack Docs: Manage projects, users, and roles," Openstack Keystone service version 12.0.1.dev19, Jul. 26, 2018, 7 pp.
"AppFormix Metrics," AppFormix, Aug. 6, 2017, 6 pp.
U.S. Appl. No. 15/946,645, bu Juniper Networks, Inc. (Inventors: Chitalia et al.), filed Apr. 5, 2018.
Response to the Office Action dated Jun. 12, 2018 from counterpart U.S. Appl. No. 15/084,927, filed Sep. 12, 2018, 15 pp.
U.S. Appl. No. 15/797,098, by Juniper Networks, Inc. (Inventors: Roy et al.), filed Oct. 30, 2017.
U.S. Appl. No. 15/846,400, by Juniper Networks, Inc. (Inventors: Chitalia et al.), filed Dec. 19, 2017.
Communication pursuant to Article 94(3) EPC dated Aug. 28, 2018 from counterpart European Application No. 14847344.0, 9 pp.
"Creating Projects in OpenStack for Configuring Tenants in Contrail," Juniper Networks, Inc., Contrail, Jan. 16, 2015, 2 pp.
"Host Aggregates," OpenStack Docs, accessed from https://docs.openstack.org/nova/latest/user/aggregates.html, accessed on Feb. 14, 2018, 3 pp.
"Improving Real-Time Performance by Utilizing Cache Allocation Technology—Enhancing Performance via Allocation of the Processor's Cache," White Paper, Intel® Corporation, Apr. 2015, 16 pp.
Extended Search Report from counterpart European Application No. 17163963.6, dated Jan. 5, 2018, 11 pp.
Hopps, "Analysis of an Equal-Cost Multi-Path Algorithm," RFC 2992, Network Working Group, Nov. 2000, 8 pp.
Roy, "AppFormix and Intel RDT Integration: Orchestrating Virtual Machines on OpenStack," AppFormix Blog, Apr. 1, 2016, 5 pp.
Roy, "CPU shares insufficient to meet application SLAs," AppFormix-TR-2016-1, Mar. 2016, 3 pp.
Roy, "Meet Your Noisy Neighbor, Container," AppFormix Blog, Mar. 31, 2016, 8 pp.
Singh, "AppFormix: Realize the Performance of Your Cloud Infrastructure—Solution Brief," AppFormix, Intel® Corporation, Mar. 27, 2016, 7 pp.
Ramakrishnan et al., "The Addition of Explicit Congestion Notification (ECN) to IP," RFC 3168, Network Working Group, Sep. 2001, 63 pp.
U.S. Appl. No. 14/811,957, by Juniper Networks, Inc. (Inventors: Banka et al.), filed Jul. 29, 2015.
U.S. Appl. No. 62/487,254, by Juniper Networks, Inc. (Inventors: Roy et al.), filed Apr. 19, 2017.
U.S. Appl. No. 15/946,645, by Juniper Networks, Inc. (Inventors: Chitalia et al.), filed Apr. 5, 2018.
Office Action from U.S. Appl. No. 15/162,589, dated Jan. 30, 2018, 19 pp.
Response filed Apr. 30, 2018 to the Office Action from U.S. Appl. No. 15/162,589, dated Jan. 30, 2018, 11 pp.
First Office Action and Search Report, and translation thereof, from counterpart Chinese Application No. 2014800588702, dated Sep. 28, 2018, 23 pp.
Response filed Jan. 2, 2019 to the Communication pursuant to Article 94(3) EPC dated Aug. 28, 2018 from counterpart European Application No. 14847344.0, 19 pp.
Final Office Action from U.S. Appl. No. 15/084,927, dated Dec. 28, 2018, 7 pp.
U.S. Appl. No. 14/290,509, filed May 29, 2014, System and Method for Improving TCP Performance in Virtualized Environments.
U.S. Appl. No. 14/617,876, filed Feb. 9, 2015, System and Method for Providing Quality of Service to Data Center Applications by Controlling the Rate Which Data Packets are Transmitted.
U.S. Appl. No. 14/619,008, filed Feb. 10, 2015, System and Method to Control Bandwidth of Classes of Network Traffic Using Bandwidth Limits and Reservations.

\* cited by examiner

500

SYSTEM AND METHOD FOR IMPROVING TCP PERFORMANCE IN VIRTUALIZED ENVIRONMENTS

CLAIM OF PRIORITY

This patent application claims the benefit of priority to U.S. Provisional Patent Application Ser. No. 61/882,768, filed on Sep. 26, 2013, which is hereby incorporated by reference herein in its entirety.

TECHNICAL FIELD

This application relates to a method and system for use in virtualized computing environments, according to one embodiment, and more specifically, for improving network protocol performance in virtualized computing environments.

BACKGROUND

Large enterprises today predominantly use virtualized data centers for their information technology (IT) infrastructure. Virtualization provides two advantages to the enterprise computing landscape. The first advantage is that virtualization can provide significant improvements to efficiency, as physical machines become significantly powerful with the advent of multicore architectures with a large number of cores per physical CPU. Further, memory has become extremely cheap today. For example, it is not uncommon to see 100 s of Gigabytes of RAM available in many commodity servers. Thus, one can consolidate a large number of virtual machines on to one physical machine. The second advantage is that virtualization provides significant control over the infrastructure. As computing resources become fungible resources, such as the cloud model, provisioning and management of the compute infrastructure becomes very easy. Thus, enterprise IT staff prefer virtualized clusters in data centers for their management advantages in addition to the efficiency and better return on investment (ROI) that virtualization provides.

While virtualization is becoming widely adopted worldwide, modern operating systems and network protocols, historically, have not been designed with virtualization in mind. Therefore, traditional Operating Systems (OS) have limitations that make them perform less efficiently in virtualized environments. Basically, as a layer of indirection is added to a physical server to abstract the CPU, memory and I/O resources, in the form of a hypervisor, new types of performance bottlenecks, such as reduction in network protocol throughput (e.g., Transport Control Protocol over Internet Protocol (TCP/IP) throughput), are created that were non-existent before.

Virtual machines (VMs) are typically assigned virtual computing instances called vCPUs (or virtual CPUs). As virtualized servers get significantly consolidated in data centers, there are a large number of VMs sharing the available CPU resources, i.e., the available physical cores (physical CPUs or pCPUs). The ratio of vCPUs allocated to all the running VMs to total available pCPUs is typically known as the overcommit ratio. The level of overcommit in different environment varies significantly, but it is rarely close to 1. The main reason for this is the fact that, in many virtualized environments, the average CPU utilization is quite low. Because of this reason, a high overcommit ratio is desirable to get the best ROI from the available compute resources.

Unfortunately, server consolidation has a significant negative impact on the performance of transport protocols such as TCP. In virtualized data centers, there is often a lot of server-to-server traffic running over the TCP protocol. The network latencies (measured as the time it takes from one server's NIC to the other server's NIC) are typically in the order of a few microseconds. Hypervisors, such as VMware, have become extremely efficient at keeping the number of instructions executed to process an individual packet to very small number. Therefore, as packets arrive from the network and the VM is scheduled, they experience very little additional latency due to virtualization. The key problem, however, is that when a given VM is not scheduled, network data transfer for a given connection within that VM effectively stops, since TCP requires both ends to be active for data transfer to progress. Even when only one end is transmitting data to the other end, it still requires the other end to respond back with acknowledgements before the transmitting end can transmit more data.

Empirical analysis has shown that traffic patterns in real enterprise clusters follows what is known as a power law distribution. Effectively, out of a given number of VMs, only a small number of them will actually generate traffic at any given time. Further, this power law is applicable even in the time domain. That is, a given VM will generate traffic every once in a while, and not all the time. Given these conditions, we can observe that all available network resources are not being used by the VM transmitting or receiving the traffic, if there are other compute-oriented VMs sharing available CPU resources that cause the network-intensive VMs to get scheduled in and out, thus degrading TCP performance significantly.

As servers are more consolidated, which occurs in environments such as the Virtual Desktop Infrastructure (VDI) space, the throughput degradation is even more significant. Since TCP is a bi-directional protocol, we observe the TCP throughput degradation in both directions—receive and send sides. The problem is even worse when a virtualized TCP sender is transmitting packets to a virtualized TCP receiver, since both ends are scheduled independently, which means, any of these ends can be off at a given time independent of each other. Since there is a much higher probability that their scheduling rounds may not be aligned, the throughput degradation is roughly double the amount when only one of the ends is virtualized and contending for CPU resources.

Various approaches to improve TCP processing in virtualized environments exist today. One approach is to keep the CPU overcommit really low (close to 1). In this case, the problem of CPU contention does not even arise and the problem does not manifest itself. The drawback of this approach is that the main benefit of virtualization, namely server consolidation, is pretty much lost.

A second approach is to have the VM offload the TCP processing to dedicated hardware referred to as the TCP Offload Engine (TOE). Since TOEs have dedicated hardware to offload the TCP processing, TCP processing can be performed even when the VM is not scheduled. Unfortunately, this approach requires specialized hardware that can be expensive and quite hard to change and reconfigure. Further, it may require proprietary drivers in the guest OSs that may be difficult in many environments such as the cloud. Due to these and possibly other reasons, this approach has not proved to be particularly popular in today's commodity data center networks.

A third possible approach is to change the scheduler to favor network-bound VMs that transmit and receive data packets. Unfortunately, it is difficult to implement this third approach since there is always an inherent need to ensure fairness across different VMs that contend for CPU resources.

Fourth, congestion control and acknowledgement generation can be performed by protocol responsibility offloading to a hypervisor with the help of a specialized plugin. This is a less intrusive option since it does not terminate TCP connections fully, but since hypervisors are scheduled typically on dedicated CPU cores, or are given higher priority, they can significantly boost TCP performance of different VMs. This approach has been previously proposed in the following two academic papers: (1) vSnoop: Improving TCP Throughput in Virtualized Environments via Acknowledgement Offload, Ardalan Kangarlou, Sahan Gamage, Ramana Rao Kompella, Dongyan Xu, in the Proceedings of ACM Supercomputing, New Orleans, La., November 2010 and (2) Opportunistic Flooding to Improve TCP Transmit Performance in Virtualized Clouds, Sahan Gamage, Ardalan Kangarlou, Ramana Rao Kompella, Dongyan Xu, in the Proceedings of ACM Symposium on Cloud Computing, (SOCC 2011), Cascais, Portugal, October 2011.

However, the Xen hypervisor approach described in these two papers have various limitations. For example, on the receive path, vSnoop acknowledges packets only if there is room in a small buffer, called a "shared buffer", located in the virtual NIC between the hypervisor and guest OS. The vSnoop approach is dependent on the specific vNIC buffer of the Xen hypervisor, and restricted by the design and implementation of the Xen vNIC buffer. If there is no room in that buffer, vSnoop cannot acknowledge packets since the packet may be lost. Further, in a realistic deployment scenario, accessing the buffer is both challenging as well as intrusive. Another limitation is on the transmit path. The particular implementation described in these papers use a Xen hypervisor, which has a proprietary virtual device channel called the Xen device channel that is used to coordinate between the TCP stack in the guest and the vFlood module. This particular design requires intrusive changes to the hypervisor-guest interface boundary, which is not desirable.

Thus, a system and method for improving TCP performance in virtualized environments, that is both effective and practically deployable, is needed.

BRIEF DESCRIPTION OF THE DRAWINGS

The various embodiments are illustrated by way of example, and not by way of limitation, in the figures of the accompanying drawings in which.

DETAILED DESCRIPTION

Figure 1:
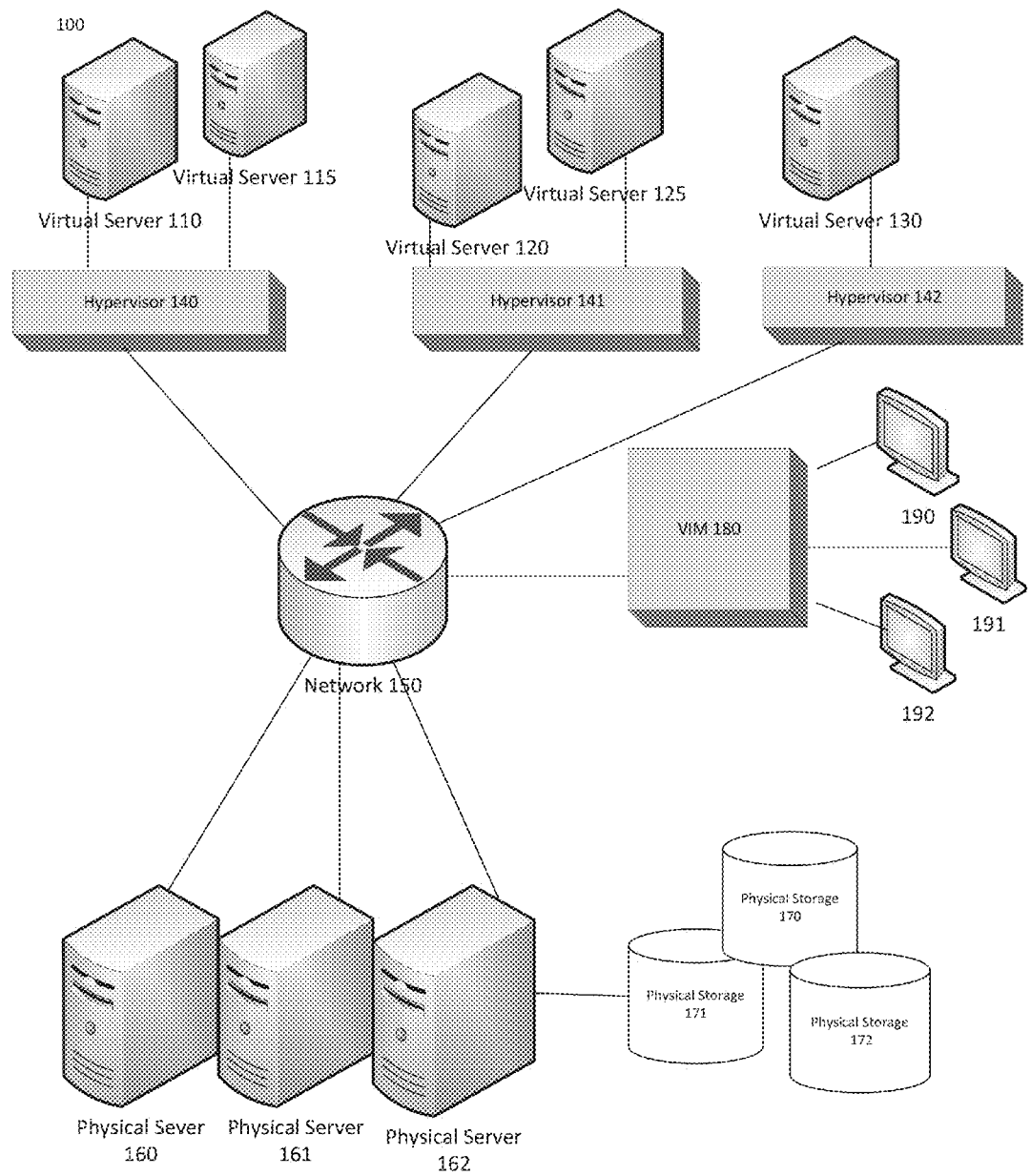
FIG. 1 is a diagram depicting a data center, according to one embodiment, illustrating both physical and virtualized IT resources.

In the following description, for purposes of explanation, numerous specific details are set forth in order to provide a thorough understanding of the various embodiments. It will be evident, however, to one of ordinary skill in the art that the various embodiments may be practiced without these specific details.

The Transmission Control Protocol (TCP) is a transmission control protocol developed by the IETF. TCP resides in the Transport Layer and is one of the core protocols of the Internet protocol suite (IP). TCP provides a communications service at an intermediate level between an application program and the Internet Protocol (IP). The TCP connection is managed by the host operating system through a programming interface that represents the local end-point for communications, the Internet socket. While IP handles actual delivery of the data (or a message), TCP keeps track of the individual units of data transmission, called segments, that divides the message into for efficient routing through the network. TCP is widely used by many of the most popular Internet applications, including the World Wide Web (WWW), E-mail, File Transfer Protocol, Secure Shell, peer-to-peer file sharing, and some streaming media applications. When an application program desires to send a large chunk of data across the Internet using IP, the software can issue a single request to TCP.

IP works by exchanging packets, which is a sequence of bytes and consists of a header followed by a body. The Internet Layer encapsulates each TCP segment into an IP packet by adding a header for the destination IP address. When the client program at the destination computer receives them, the TCP layer (Transport Layer) reassembles the individual segments and ensures they are correctly ordered and error free as it streams them to an application. TCP's reliable stream delivery service guarantees that all bytes received are identical with bytes sent and in the correct order. A version of the TCP specification can be found in the IETF RFC 793 or later IETF TCP RFCs releases.

TCP Protocol operations have three phases: (1) connection establishment phase, (2) data transfer phase, and (3) connection termination phase. TCP uses a three-way handshake to establish a bi-directional connection. The connection must be established before entering into the data transfer phase. After data transmission is complete, the connection termination closes established virtual circuits and releases all allocated resources.

The TCP data transfer provides an ordered data transfer, where the destination host rearranges the data packets according to the sequence number. Lost packets are retransmitted, for example, any segment in the TCP stream not acknowledged is retransmitted. Flow control is used to limit the rate a sender transfers data to guarantee reliable delivery. For flow control, the receiver continually hints to the sender on how much data can be received (controlled by the sliding window). When the receiving host's buffer fills, the next acknowledgement contains a 0 in the window size, to stop transfer and allow the data in the buffer to be processed. Congestion control uses several mechanisms to control the rate of data entering the network, keeping the data flow below a rate that would trigger a collapse. For congestion control, acknowledgments for data sent, or lack of acknowledgements, are used by senders to infer network conditions between the TCP sender and receiver. Coupled with timers, TCP senders and receivers can alter the behavior of the flow of data.

The various example embodiments described herein provide TCP performance improvements by offloading some of the TCP processing (between a TCP sender and TCP receiver) to a TCP acceleration module without modifying the normal TCP processing at the TCP sender and TCP receiver. The TCP acceleration module, located within a hypervisor, is also referred to as the vTCP module. The TCP processing performed by the TCP acceleration module is generally for the fast path processing. This refers to TCP data transfer processing of in-sequence data packets when the TCP acceleration module has available buffer space to store data packets.

The TCP acceleration module may be installed and maintained anywhere along the data path from the TCP sender/receiver within the guest OS to the physical NIC. The TCP acceleration module includes its own buffer and does not rely on the shared buffer with vNIC interfaces. By having its own buffer, the TCP acceleration module does not depend on up-to-date information about the occupancy of the vNIC ring buffer and has the flexibility to be located at various locations in along the data path. Various embodiments of the TCP acceleration module incorporate a packet loss recovery algorithm to allow recovering from any potential packet losses that occur between the TCP acceleration module and the guest OS TCP sender/receiver, if packets are only early acknowledged and if the vTCP buffer is not full.

During fast path processing, various TCP data transfer processing functions are offloaded to the TCP acceleration module, such as acknowledgement generation by having the TCP acceleration module implement an early acknowledgement process along with a packet loss recovery process. Due to network congestion, traffic load balancing, or other unpredictable network behaviors, IP packets can be lost, duplicated, or delivered out-of-order. TCP detects these problems, requests retransmission of lost data, rearranges out-of-order data, and even helps to minimize network congestion. To the extent that these TCP data transfer processes are performed in the fast path mode, these processes may be offloaded to the TCP acceleration module to accelerate the TCP data transfer. When operating in the slow path mode, the TCP acceleration module is bypassed, and normal TCP processing between the TCP sender and TCP receiver occurs without TCP processing performed by the TCP acceleration module. As described in more detail below, various accelerated TCP data packet processing can be realized based on the various embodiments described herein. In alternative embodiments, network or internet protocols other than the TCP/IP protocol may be used.

FIG. 1 is a diagram depicting a data center 100, according to one embodiment, illustrating both physical and virtualized IT resources. The data center 100 shows various components working together to provide virtualized IT resources supported by physical IT resources. Grouping IT resources in data centers allows for power sharing, higher efficiency in shared IT resource usage, and improved accessibility for IT personnel. Modern data centers house centralized IT resources, such as servers, databases, networking and telecommunication devices, and software systems. Such data centers may include both physical and virtualized IT resources. With virtualization, multiple virtual copies of the server environment can be hosted by a single physical server. Each copy can be provided to different users, can be configured independently, and can contain its own operating systems and applications.

The physical IT resources shown in FIG. 1 include the physical servers 160, 161 and 162, physical storage 170, 171 and 173 and network hardware 150. Also included in the hardware are computer systems 190, 191 and 192 in communication with the virtualization infrastructure management (VIM) tools 180.

Server virtualization is the process of abstracting IT hardware into virtual servers using virtualization software. A virtual server is created through virtualization software by allocating physical IT resources and installing an operating system. Virtual servers use their own guest operating systems, which are independent of the operating system in which they were created. The virtual IT resources in FIG. 1 include virtual servers or VMs 110, 115, 120, 125, and 130 along with hypervisors 140, 141 and 142 and VIM 180. The hypervisors 140, 141 and 142 are primarily used to generate virtual server instances of a physical server. A hypervisor is generally limited to one physical server and can therefore only create virtual images of that server. For example, hypervisor 140 can create virtual images of physical server 160 in VMs 110 and 115. The VIM provides a range of features for administering multiple hypervisors across physical servers.

A technique known as positive acknowledgment with retransmission is used to guarantee reliable TCP data packet transfers. This technique requires the TCP receiver to respond with an acknowledgement message as it receives the data. The TCP sender keeps a record of each packet it sends. The TCP sender also maintains a timer from when the packet was sent, and retransmits a packet if the timer expires or timeout occurs before the message has been acknowledged. The timer is needed in case a packet gets lost or corrupted. Referring to FIG. 1, a TCP connection may be established between one of the physical servers 160, 161 and 162 and one of the virtual servers 110, 115, 120, 125, 130. For example, if a TCP connection can be established between physical server 160 and virtual server 110, either physical server 160 or virtual server 110 may be the TCP receiver or TCP sender, since the connection is bidirectional. The positive acknowledgement with retransmission technique described in this paragraph can be used to transfer TCP packet data between physical server 160 and virtual server 110.

Figure 2:
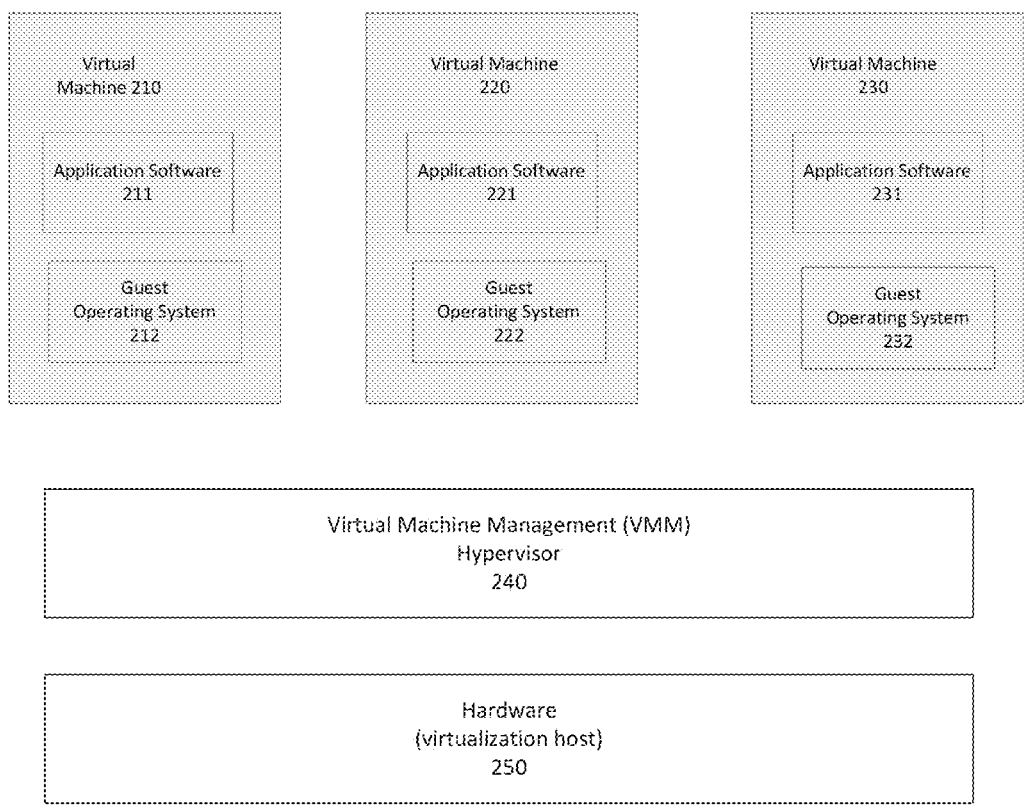
FIG. 2 is a block diagram illustrating an example embodiment of a hardware-based virtualization system.

FIG. 2 is a block diagram illustrating an example embodiment of a hardware-based virtualized system 200. In this embodiment 200 a single physical computer system 250 (also referred to as the virtualized host or hardware host) may contain one or more instantiations of VMs, such as VMs 210, 220 and 230. In this embodiment 200, the computer system 250 has a software layer called a hypervisor 240 installed thereon, which provides a virtualization platform and may be used to manage and monitor the one or more instantiations of virtual machines 210, 220 and 230 on the computer 250. In this example, the hypervisor 240 is installed directly on the native hardware of the computer 250; however, hypervisors may also be installed as a software layer in a native operating system, known as a host operating system.

In this embodiment 200 the hypervisor 240 has three instantiations of virtual machines (VMs) 210, 220 and 230 installed thereon. Respective virtual machines have operating systems, such as operating systems 213, 223, and 233, and various program applications, such program applications 211, 221 and 231. As described above, the operating systems and applications run substantially isolated from the other VMs co-located on the same physical machine 250. Respective VMs communicate directly with the hypervisor 240, which in-turn, communicates with the respective VMs 210, 220 and 230.

Figure 3:
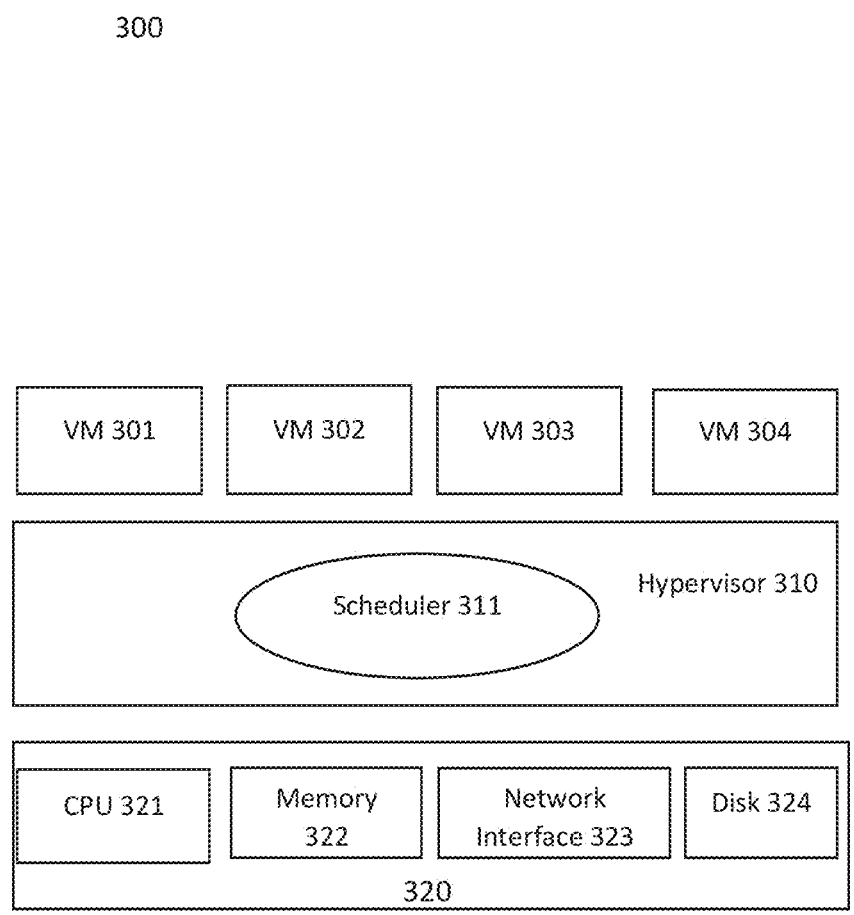
FIG. 3 is block diagram of a virtualized host with multiple VMs, according to an example embodiment.

FIG. 3 is block diagram of a hypervisor 310, according to an example embodiment. Hypervisor 310 is virtualization software that provides a simple user-interface. Hypervisor 310 exists as a thin layer of software that handles hardware management functions to establish a virtualization management layer. Device drivers and system services are optimized for the provisioning of virtual servers or VMs. The virtualization layer is designed to communicate directly with the host hardware 320, requiring all associated device drivers and support software to be compatible with hypervisor 310. This is often referred to as hardware-based virtualization.

The hypervisor software 310 can be installed directly in the virtualized host 320 and provide features for controlling, sharing and scheduling the usage of hardware resources, such as processor power, memory, and I/O. These can appear to each virtual server's operating system as dedicated resources. CPU 321, memory 322, network interface 323 and disk 324 represent various components within virtualized host 320. The scheduler 311 is responsible for scheduling CPU resources for VMs 301, 302, 303, and 304. As more VMs share the same core/CPU 321, the CPU scheduling latency for each VM increases significantly. Such increase has a negative impact on the performance of TCP transport to the VMs 301, 302, 303 and 304.

Figure 4:
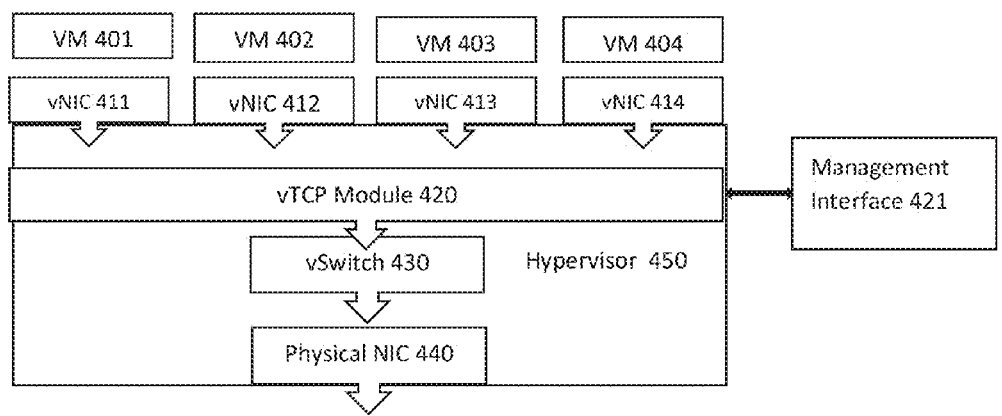
FIG. 4 illustrates an example embodiment of a hypervisor with a vTCP module.

FIG. 4 illustrates a block diagram of a hypervisor 410 which includes a vTCP module 420 for accelerating TCP performance between two hosts, according to various embodiments. The hypervisor 410 includes virtual NICs (referred to vNICs), such as vNICs 411, 412, 413 and 414, that communicates with VMs 401, 402, 403 and 404. The hypervisor 410 includes a virtual Switch (vSwitch), such as vSwitch 430 that communicates with a physical NIC 440 of the virtualized host (not shown). Also included in hypervisor 410 is a vTCP module 420. The vTCP module 420 is also referred to as a TCP acceleration module. In the embodiment shown in FIG. 4, the virtual data path includes vNICs 411, 412, 413 and 414, the vTCP module 420 and the vSwitch 430. In alternative embodiments, the vTCP module 420 can be located elsewhere along the virtual data path and is agnostic to the exact location. For example, vTCP module 420 can be located below vSwitch 430 without impacting the performance of hypervisor 450.

In example embodiments, the vTCP module 420 includes a local buffer (not shown) that is configurable and manageable through an outside management entity shown by a management interface 421. Examples of outside management entities include VMWare's vSphere or OpenStack's configuration platform. The vTCP module 420 improves TCP throughput in virtualized environments. The vTCP module 420 seamlessly plugs into a hypervisor 450, such as VMWare ESX, Xen, and KVM and accelerates TCP connections without disrupting or requiring cooperation from the end host TCP stack. In various embodiments, the management interface 421 may provide a centralized way to administer, configure and control the behavior of TCP in a data center. For example, vTCP module 420 may provide several "tuning knobs" for controlling the various aspects of TCP. The knobs can be configured on a per-virtual machine and/or per-flow basis, where a flow can be any combination (including wild cards) of fields from the packet, including, source IP address, destination IP address, ports and other protocol fields. In addition, the configured values of these knobs can be changed one or more times during the life-time of the TCP connection, for example, during the beginning of the connection, or for the first 1 MB of data transfer, or any such arbitrary period within the connection's lifetime. These tuning knobs allow modifying the behavior of TCP independently of how the TCP stack operates inside the virtual machine (guest operation system). Such flexibility is useful especially since operating systems use TCP settings that are quite conservative and are based on old IETF specifications and publications/proposals (e.g., RFCs). Upgrading the TCP stack may not be an option since they may be running old applications, which are difficult to replace. It may be difficult even in situations where the infrastructure provider does not have control over the TCP behavior of the guest operating system.

In example embodiments, the various tuning knobs and settings provided by the vTCP module 420 may include, but are not limited to, a congestion control algorithms knob(s), congestion control parameters knob(s), and (3) flow differential knobs. In alternative embodiments, configuring TCP control data or setting TCP parameters may be implemented using other forms of data input without using tuning knob(s).

For one embodiment, congestion control algorithm knob (s) or settings are used to apply different stock congestion control algorithms (e.g., Cubic, NewReno) with their standard settings for different flows/connection. Thus, the vTCP module 420 may provide a simple way to override the TCP connection behavior of the guest operations systems in a TCP stack, without any modifications to the guest operating system.

For other embodiments, congestion control parameter knob(s) or settings may be used to select different settings for various congestion control parameters such as initial congestion window, slow start threshold, rate at which the additive increase of the congestion window happens, the congestion window decrease factor upon encountering packet loss, and the duplicate ACK threshold for triggering fast retransmission. In an example embodiment, the initial congestion window which may be set to the default conservative value of 1, or 3, or the relatively more recently introduced value of 10 maximum segment size (MSS), or even something not specified in any IETF TCP specification or publication/proposal (e.g., RFCs). In another example embodiment, instead of the default action of reducing the congestion window by ½ whenever a packet loss is encountered, it could be set to ¾ to ensure that certain TCP connections stay aggressive.

In further embodiments, flow differentiation knob(s) or settings can be used to select different parameters for different TCP connections based on the overall network conditions according to a centrally defined policy, for example, to selectively favor certain real-time or deadline-oriented connections more than bulk-transfer oriented connections.

For an example embodiment, the vTCP module 420 allows deviation from RFC-compliant settings for specific flows, such as those where both end-points of the TCP connection are inside the data center for which such deviation or experimentation is easily permissible. For other example embodiments, the client-facing or the public-Internet facing connections, standards compliant TCP behavior can be exposed. In yet further embodiments, given that the protocol buffer in the vTCP module 420 is a scarce resource, allocation to those connections can be prioritized, providing beneficial additional buffer space.

In various embodiments, the vTCP module 420 can also assist in measurement and diagnosis of TCP connection problems in virtualized environments where scheduling can play a significant role in affecting TCP connections. For example, the vTCP module 420 can measure individual round-trip times (RTTs) from the Virtual Machine (TCP sender) to the vTCP module 420, and from the vTCP module 420 to the other end (TCP receiver). For example, with reference to FIG. 7, RTT is measured from the TCP sender 799 to the vTCP module 775, and from the vTCP module 775 to the TCP receiver 799.

This will help in understanding and diagnosing of the connection experiences bad throughput. For example, evidence of high RTT between the VM and the vTCP module 420 will clearly indicate that the scheduling bubbles are causing significant dip in TCP performance, should that be empirically observed. In other examples, if the RTTs appear fine, then it is possible that there may congestion inside the network causing bad throughput. Thus, diagnosis becomes easier with vTCP module 420. The vTCP module 420 could also measure and monitor many other common TCP connection characteristics such as, number of duplicate ACKs, number of duplicate packets, number of retransmissions, etc. that would allow system administrators, such as IT staff, to obtain TCP information in a centralized fashion. In example embodiments, the management interface 421 may be used to perform diagnosis, measurements and monitoring of TCP throughput and connection characteristics.

The vTCP module 420 provides improved TCP throughput between the TCP sender and receiver by accelerating the TCP processing. The vTCP module 420 runs inside hypervisor 450 which is either always scheduled (using a dedicated core for privileged hypervisor) or scheduled with priority. Since the basic time critical functions of TCP are implemented within vTCP module 420, TCP performance is improved significantly. In embodiments where there are sufficient hypervisor CPU cycles, full line rate for the TCP connection can be achieved.

Figure 5:
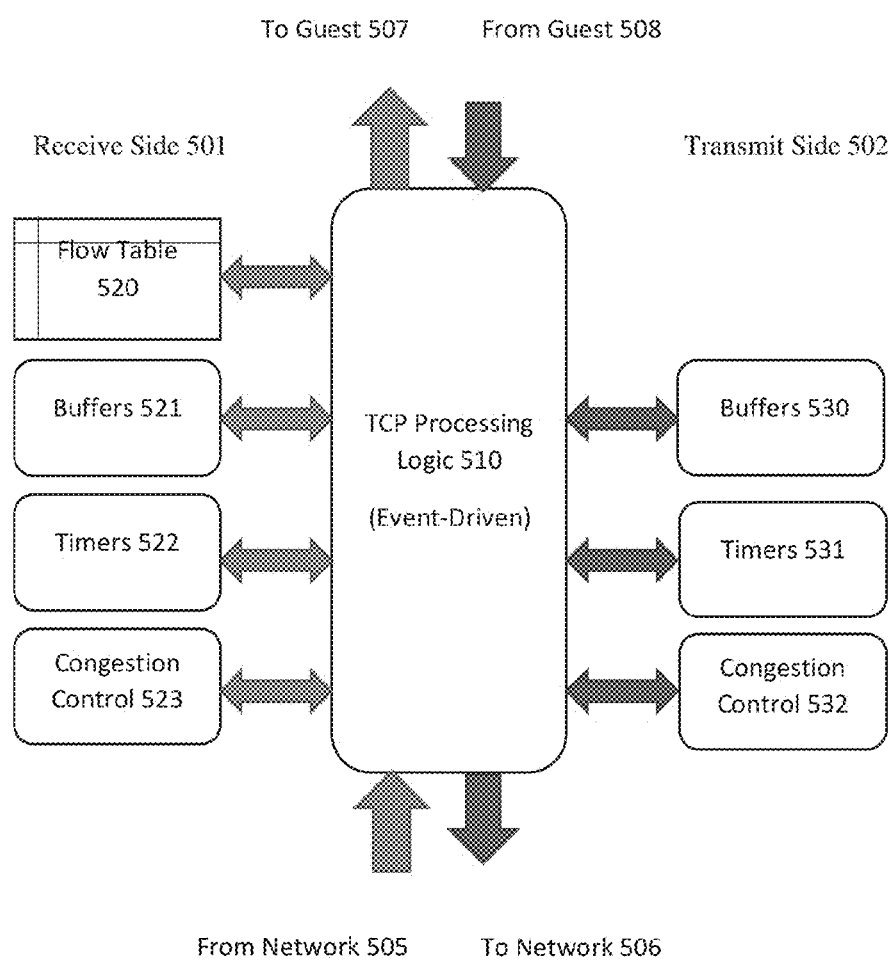
FIG. 5 illustrates a vTCP architecture according to a particular embodiment.

FIG. 5 illustrates a vTCP module 500 architecture according to a particular embodiment. For various embodiments, the vTCP module 500, also referred to as a protocol acceleration module, represents an in-band architecture. An in-band architecture relies on observing the TCP packets passing through vTCP module 500, and a guest TCP stack is not aware of the presence of the vTCP module 500. On the receive side 501, the TCP packets are sent from a network 505 to a guest 507. On the transmit side 502, TCP packets are sent from a guest 508 to a network 506. The in-band architecture of the vTCP module 500 provides accelerated TCP processing by signaling to the TCP sender to transmit more packets (via early acknowledgements) and implements full congestion control protocols.

The receive side 501 includes a buffers 521, timers 522, and congestion control 523. The transmit side 504 includes buffers 530, timers 531 and congestion control 532. Both the receive side 501 and the transmit side 504 share a flow table 520 since TCP is a full duplex protocol.

The receive-side buffer holds all packets for each and every TCP connection that needs to be accelerated by vTCP module 500. Since no out-of-order packets are processed by the vTCP module 500, the buffer contains only in-order segments or in-sequence data packets. The receive-side buffer holds packets along the receive path 501 (from the network 505 to the guest VM 507). The transmit-side buffer is similar to the receive side buffer, except for the fact that the buffer applies to packets that are going from the guest VM 508 towards the network 506. Again, only in-order segments are processed by the vTCP module 500, the buffer will only store in-order packets. The fact that the buffer consists of only in-order packets allows the buffer management functions and vTCP functions to be relatively lightweight. It is entirely possible, however, to add extra buffer space for out of order segments as a simple extension, particularly in the receive direction where the data center network may drop certain packets causing out of order packet arrival. On the transmit side 502, it is very unlikely that the VM will transmit out of order packets since the vNIC will cause back pressure all the way to the TCP socket in guest OS, causing no packet loss. Therefore, the transmit buffer 530 may not need to buffer these out of order packets although it can be added if necessary.

Retransmit timers are needed on both the transmit side 502 and the receive side 501 independently for retransmitting packets for which there is no acknowledgement received within a given duration of time or a timeout occurs. Timers 522 is on the receive side 501 and timers 531 are on the transmit side.

The TCP processing logic 510 is the central core logic for the vTCP module and is event-driven in nature. In response to either ingress- or egress-direction packets, the logic basically determines the actions corresponding to the processing.

The congestion control module 523 on the receive side ensures that the shared buffer between the vTCP module and the TCP receiver inside the VM is not overwhelmed. It also recovers any packets that have been lost due to an overflow of the buffer between the vTCP module and TCP receiver inside the VM. Congestion control module 532 is on the transmit side 502 and applies a TCP standards compliant congestion control algorithm (e.g., NewReno, Cubic) between the vTCP module and a remote receiver. Both of the packet loss recovery algorithm/processing and the congestion control algorithm/processing are used to ensure packets that are lost along the receive path or the transmit path, respectively, are retransmitted.

The flow table 520 stores the TCP connection information and state (e.g., maximum size segment (MSS) value, various TCP options, and sequence number information) for each and every connection. In various embodiments, the TCP connection information and state for the TCP connections are defined by the data in the one or more of the TCP header fields, which will be briefly described in the next paragraph below. In further embodiments, the flow table 520 may store additional TCP connection and state information which are not included in the data from the TCP header fields, such as location information for the copy of TCP data packets stored in the vTCP buffer. The flow table 520 stores common information used by both the receive side 501 and the transmit side 502 sides. For an example embodiment, the per-flow TCP control information stored in flow table 520 includes: the sequence number of the in-sequence packet expected to be received by vTCP module 500, the sequence number of the in-sequence packet expected to be received by the VM, the TCP window size, the current mode of operation pass through or accelerated (also referred to as the slow path and fast path modes respectively), and the pointer to the vTCP buffer or protocol accelerator buffer (such as buffers 521 and 530) where TCP data packets are stored. The pointer provides location information for the TCP data packets having a copy stored in the vTCP buffer including the receive side buffer 521 and the transmit side buffer 520.

More specifically, the TCP data packets include a data section that follows the TCP header, which contains 10 mandatory fields, and an optional extension field. The data header fields include the following fields: Source Port (identifies the port number of a source application program); Destination Port (identifies the port number of a destination application program); Sequence Number (specifies the sequence number of the first byte of data in this segment); Acknowledgment Number (identifies the position of the highest byte received); Data Offset (specifies the offset of data portion of the segment); Reserved Code (for future use); Flag or Control Bits (9 1-bit flags to identify the purpose of the segment); Window (specifies the amount of data the destination is willing to accept); Checksum (verifies the integrity of the segment header and data); Urgent Pointer (indicates data that is to be delivered as quickly as possible); and Options (which includes (1) End of Options List— indicates end of the option list (2) No Operation—indicates boundaries between options; (3) Maximum segment size (MSS)—maximum segment size TCP can receive, which is only sent in the initial connection request). The Control bits include the following 1-bit flags: URG (urgent pointer field is valid), ACK (Acknowledgment field is valid); PSH (Segment request a PUSH); RTS (Resets the connection); SYN (Synchronizes the sequence numbers); and FIN (sender has reached the end of its byte stream). Three additional 1-bit flags, which support explicit congestion notification (ECN) that allows end-to-end notification of network congestion without dropping packets, include: NS (ECN-nonce concealment protection); CWR (Congestion Window Reduce flag); and ECE (ECN-Echo indicates). The contents of the data section are the payload data carried for the application. The length of the data section is not specified in the TCP segment header; however, the length of the data section may be calculated by subtracting the combined length of the TCP header and the encapsulating IP header from the total IP datagram length (specified in the IP header).

As mentioned above, the flow table 520 also stores TCP connection information and state for each and every connection. The various fields in the headers of the TCP packets contain TCP connection information and state information for the TCP packets. In various embodiments, the vTCP module 500 receives and stores a copy of the TCP packet data (in buffers 521 and/or flow table 520), and further allows changes to be made to the copy of the TCP header information stored in flow table 520, without altering the actual TCP packet data, which will be received by a TCP receiver, such as TCP receiver 699 or 798. For example, a TCP flow may include any combination of fields from the TCP packet data, including the source IP address included in the Source Port, the destination address included in the Destination Port, and any of the other data stored in the TCP header fields that may be configured on a per-virtual machine and/or per-flow basis anytime during the life-time of the TCP connection. This data, stored within vTCP module 500 may be referred to configurable TCP control data. By enabling a system administrator of a system including a vTCP module 500 to configure the TCP control data, the behavior of TCP may be modified independently of how the TCP stack operates inside a virtual machine (VM) guest operating system (e.g., guest operation systems 212, 222, or 232). Such flexibility may be useful especially in situations where operating systems use TCP settings that are quite conservative and based on the IETF old publications and/or proposals (e.g., RFCs) that may or may not get adopted as internet standards. Upgrading the TCP stack may not be an option since they may be running old applications, which are difficult to replace. It may be difficult even in situations where the infrastructure provider does not have control over the TCP behavior of the guest operation system. For example embodiments, a system administrator or IT staff may configure TCP control data via the management interface 421, shown in FIG. 4.

Figure 6:
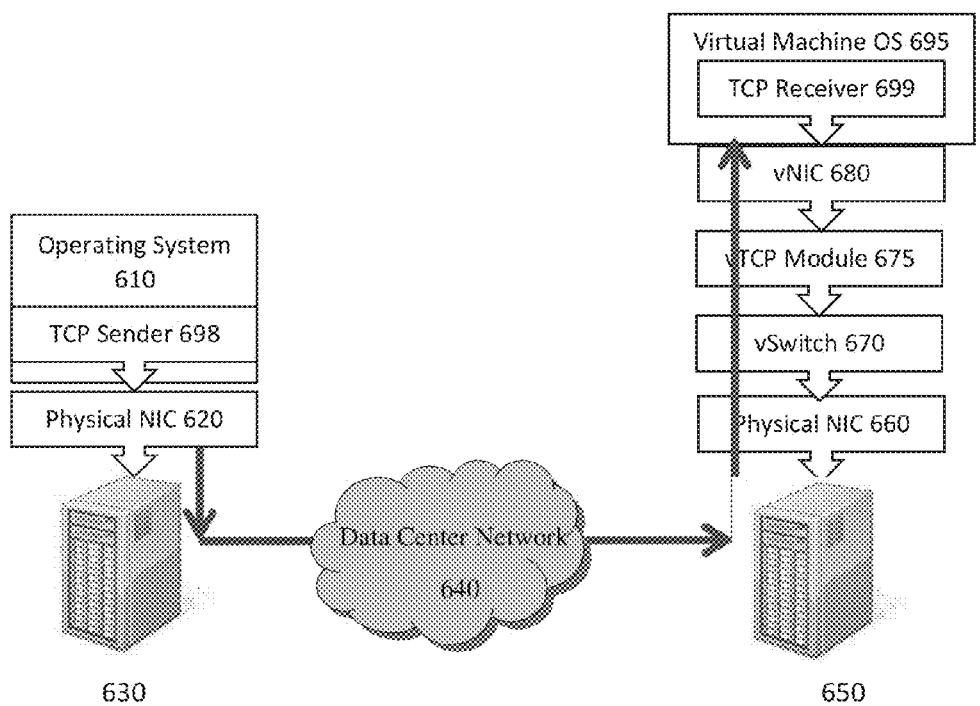
FIG. 6 illustrates a data path from a physical server to a virtual server, according to an example embodiment.
Figure 7:
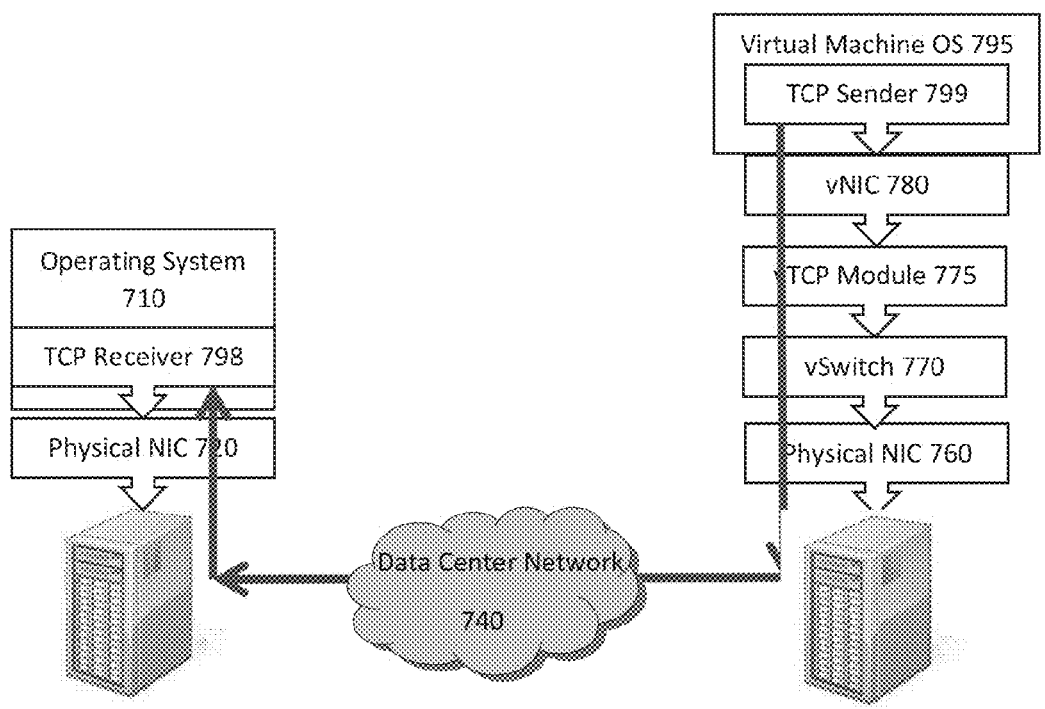
FIG. 7 illustrates a data path from a virtual server to a physical server, according to an example embodiment.

The vTCP module 500 performs fast path (or accelerated) TCP processing between two hosts. Fast path processing usually dominates over slow path processing. Fast path processing refers to the TCP processing of in-sequence packets when the vTCP buffer has enough space to store the in-sequence packet being transmitted from the TCP sender to the TCP receiver. Fast path for accelerating TCP processing is performed by having vTCP module 500 take over certain responsibilities of the TCP processing from one of the hosts without changing TCP protocol processing and semantics at either hosts. In various embodiments, either the TCP sender or the TCP receiver is inside a virtual machine. The other end of the TCP can be either a physical or virtual system. Throughout this specification, the receive data path, as shown in FIG. 6 refers to the case where TCP receiver is inside the VM, and the transmit data path, as shown in FIG. 7 refers to the case where the TCP sender is inside a VM. TCP throughput between hosts is improved with accelerated fast path processing because the vTCP module takes over responsibility for many TCP functions such as acknowledgement generation, packet retransmission, flow control, congestion control, etc.

FIG. 6 illustrates an embodiment of a data path 600 from a TCP sender 698 to a TCP receiver 699 and referred to as the receive side. In this embodiment, the TCP sender 698 is inside a physical server 630 and the TCP receiver 699 is inside a VM 650. For an alternative embodiment, physical sever 630 may be replaced with a virtual server. TCP connection is managed by an operating system through a programming interface that represents the local end-point for communications, the Internet socket. The TCP sender 698 within operating system 610, transmits a data packet through physical NIC 620 of a physical server 630, data center network 640 to a physical NIC 660 of a virtualized host 650, where it is transmitted through vSwitch 670, vTCP module 675 (for fast path accelerated TCP processing), vNIC 680 to TCP receiver 699 within VM OS 695.

In the receive direction, a TCP sender 698, either inside a physical machine or a virtual machine 630, transmits data packets towards a TCP receiver 699 that resides within a virtual machine guest OS 695. Here, most data packets are transmitted towards the guest OS 695, while TCP acknowledgement packets are transmitted from the TCP receiver 699 to the TCP sender 698. As shown in FIG. 6, the vTCP module 675 lies between the TCP receiver 699 in the guest OS 695 and the physical NIC 660. The exact location where the vTCP module needs to be present can vary, and the architecture and solution of the various embodiments is agnostic to the exact location. For example, vTCP module 675 can be positioned below the vSwitch 670.

The various steps involved in the TCP processing at the receive side 699, including the specific steps taken by the vTCP module for acceleration, are described below. The TCP sender 698 initiates a TCP session with the TCP receiver 699 using the standard 3-way handshake. During the basic TCP 3-way handshake step, the vTCP module 675 observes all packets being sent between the TCP sender 698 and the TCP receiver 699 in both directions and keeps track of the initial sequence number and other details of the TCP session. The vTCP module 675 will also parse TCP options to figure out whether options such as DSACK and timestamps are enabled, and also note the window scale factor used.

The TCP sender 698 starts sending data packets towards the TCP receiver 699. If the vTCP module observes packets in-sequence, it will make a copy of the packet within a local buffer and generate an early acknowledgement on behalf of the target TCP receiver 699. The local buffer lies within the vTCP module 675 and is configurable and manageable through an outside management entity, as shown by Management Interface 421 in FIG. 4. The local buffer can be referred to as the protocol accelerator buffer. The vTCP module 675 internally manages the protocol accelerator buffer to keep track of packets. For various embodiments, the vTCP module 675 includes packet loss recovery processing. Based on acknowledgements (or lack thereof) from the TCP receiver 699 (also referred to as "receiver acknowledgements"), the vTCP module determines whether to retransmit packets. In order to retransmit packets, a copy of the packets are stored in the vTCP module 675 in a local buffer referred to as the protocol accelerator buffer. If the receiver acknowledgements are not received within a timeout period, potentially because of packet loss, the packet loss recovery processing will ensure retransmission of these packets.

Once the target TCP receiver receives the data packets, it will also generate acknowledgements corresponding to these packets. Since these data packets have already been acknowledged by the vTCP module 675 during the early acknowledgement process, these acknowledgements are intercepted by the vTCP module 675 and are dropped.

The duplicate acknowledgement generation, for packets that have already been acknowledged before, is done by the vTCP module 675 for packets coming in from the TCP sender 698 just like a regular TCP receiver 699 would anyways. If a duplicate packet arrives for which there is already a copy in the local buffer, it would just drop the packet.

Since the vTCP buffer is a limited resource, it may become full, particularly if the TCP receiver 699 is slow to accept packets. In such a case, the vTCP module 675 enters an "OFF" state where by it does not generate any early acknowledgements for any data packets coming from the TCP sender 698. It just passes these packets through to the VM to essentially give the control back to the end hosts. In an alternative approach, the vTCP module could modify the receive window advertised by the receiver to factor in the occupancy of the buffer resources, so that the sender never transmits segments that are outside the window.

Once buffer space opens up, again, it starts the early acknowledgement process for any data packets in order. If packets arrive out of order, the vTCP module 675 shuts itself "OFF" and let the VM handle these packets. In other words, any slow path processing that is required is handled by the VM's TCP receiver 699. Only fast path processing, which usually dominates the lifetime of a given TCP connection, is handled by the vTCP module 675.

The vTCP module 675 also maintains a timer to retransmit a packet from the buffer to the TCP receiver 699 after a timeout period has expired. Retransmits are important since it is not guaranteed that a packet that is buffered in the vTCP module 675 after passing the packet along will be received by the TCP receiver 699. It could be that the shared buffer between the host/guest may be full in which case the packet may be dropped.

If there is no acknowledgement back from the TCP receiver 699 corresponding to a packet sent before, the vTCP module 675 uses a simple retransmission algorithm (e.g., keep doubling the retransmit timer) and retransmit again at regular intervals for a certain number of times. This approach ensures that if packets have been early acknowledged, the vTCP module retains responsibility to ensure the target TCP receiver 699 eventually gets these packets. Alternately, the vTCP module can also use a full-fledged congestion control algorithm similar to what TCP uses today to ensure network resources are not overly congested. For example, standard congestion control algorithms may be implemented such as New Reno, Cubic. In addition, newer variants of congestion control algorithms may be implemented, which are in the broad category of additive increase multiplicative decrease (AIMD) algorithms, but different variants from those proposed in the standards. For example, in standard congestion control algorithms, on discovering a packet loss episode, the protocol reduces the congestion window by half typically. We could reduce the congestion window by a different factor, such as ¾ instead of half so that the backoff is not as aggressive as the standard TCP algorithm.

The vTCP module provides fine-grained control to determine which TCP connections need better quality of service (QoS) and prioritize the downstream resources (from the vTCP module to the TCP receiver 699) across different connections that share them. In the default mode, we provide fair access to the buffer resources for all connections. However, in alternative embodiments, the default mode may be modified, as needed, for a particular network. For example, one connection could be given lot of buffer, while another could be given less buffer and some other connection zero buffer space.

FIG. 7 illustrates an embodiment of a data path 700 from a TCP sender 799 to a TCP receiver 798 and referred to as the transmit side. In this embodiment, the TCP sender 799 is inside a virtualized host 750 and the TCP receiver 798 is inside a physical host 730. For an alternative embodiment, physical sever 730 may be replaced with another virtual server. The TCP connection is managed by an operating system through a programming interface that represents the local end-point for communications, the Internet socket. The TCP sender 799 resides within operating system 795, transmits a data packet through vNIC 780 of the virtualized host 750 having vTCP module 775 and vSwitch 770, data center network 740 to a physical NIC 730 of a server 730, where it is received by a TCP receiver 698 residing within VM OS 710.

The TCP receiver 798 can be present either within a physical host 730 (as shown in the figure) or even a virtual server. The various steps involved in the TCP processing in the receive side, including the specific steps taken by the vTCP module 775 for acceleration, are described below.

The TCP sender 799 above initiates a TCP session with the TCP receiver 798 using the standard 3-way handshake. During the basic TCP 3-way handshake step, the vTCP module 775 observes all packets between the TCP sender 799 and TCP receiver 798 in both directions and keeps path of the initial sequence number and other stuff for the TCP session. The vTCP module 775 will also parse TCP options to figure out whether options such as DSACK and timestamps are enabled and also the window scale factor. It will keep track of these session parameters locally for this session in a flow table, such as flow table 520 shown in FIG. 5.

The TCP sender 799 starts sending data packets towards the TCP receiver 798. If the vTCP module observes packets "in order", it will make a copy of the packet within a local buffer, such as buffer 530 and generate an early acknowledgement back to the TCP sender 799. The local buffer lies within the vTCP module 775 and its size is configurable through an outside management entity such as VMWare's vSphere or OpenStack's configuration platform, as shown by the management interface 421 in FIG. 4.

The TCP receiver 798 will eventually generate acknowledgements corresponding to these data packets once it receives them. These acknowledgements are intercepted by the vTCP module 775 and are dropped by the vTCP module 775 if the acknowledgements were already generated by the early acknowledge module.

The duplicate acknowledgement generation, for packets that have already been acknowledged before, is done by the vTCP module 775 for packets coming in from the TCP sender 799 side just like a regular TCP receiver 798 would anyways. If a duplicate packet arrives for which there is already a copy in the vTCP buffer, the vTCP module just drops the packet.

Since the vTCP buffer is a limited resource, it may become full, particularly if the TCP receiver 798 is slow to accept packets. In which case, the vTCP module 775 enters an "OFF" state where by it does not generate any early acknowledgements for any data packets coming from the TCP sender 799. It just passes these packets through to the VM to essentially give the control back to the end hosts. Once buffer space opens up, again, it starts the early acknowledgement process for any data packets in order. Alternately, the vTCP module 775 can modify the window size to reflect the buffer resources in the vTCP module 775 to the TCP sender to effectively perform "flow control".

If packets arrive out of order, the vTCP module 775 shuts itself "OFF" and lets the VM handle these packets. In other words, any slow path processing that is required is handled by the VM's TCP sender 799. Only fast path processing, which arguably dominates the lifetime of a given TCP connection, is handled by the TCP module.

The vTCP module 775 implements TCP's full congestion control protocol, which involves essentially monitoring the congestion window increase and decrease semantics. Any available TCP congestion control protocol (such as TCP Bic/Cubic, High Speed TCP, Reno) can be emulated inside the vTCP module 775. It also maintains timers to retransmit packets from the buffer to the TCP receiver 798 should an acknowledgment not be received within a given time. Retransmits are important since it is not guaranteed that a packet that is buffered in the vTCP module 775 after passing the packet along will be received by the TCP receiver 798. It could be that the network may drop the packet, in which case it needs to be retransmitted.

TCP provides a connection-oriented, reliable, byte stream service. TCP transfers a contiguous stream of bytes by grouping the bytes in TCP segments, which are passed to IP for transmission from a TCP sender to TCP receiver. The term "TCP packets" and "data packets" described herein refers to the TCP segments passed to IP for transmission between the protocol sender and receiver (such as the TCP sender and the TCP receiver, respectively). The TCP sender assigns a sequence number to each byte transmitted, and expects a positive acknowledgment back from the TCP receiver. The sequence number provides information as to whether bytes received are in-sequence or out-of-order. In general, if a positive acknowledgment is not received within a timeout interval, or timeout period, the data is retransmitted. TCP also implements flow control, such as a sliding window, to prevent the overflow of the TCP receiver's buffers. The TCP receiver sends an acknowledgement back to the TCP sender, which indicates to the TCP sender the number of bytes it can receive beyond the last received TCP segment, without causing an overflow of the TCP receiver buffers.

Figure 9:
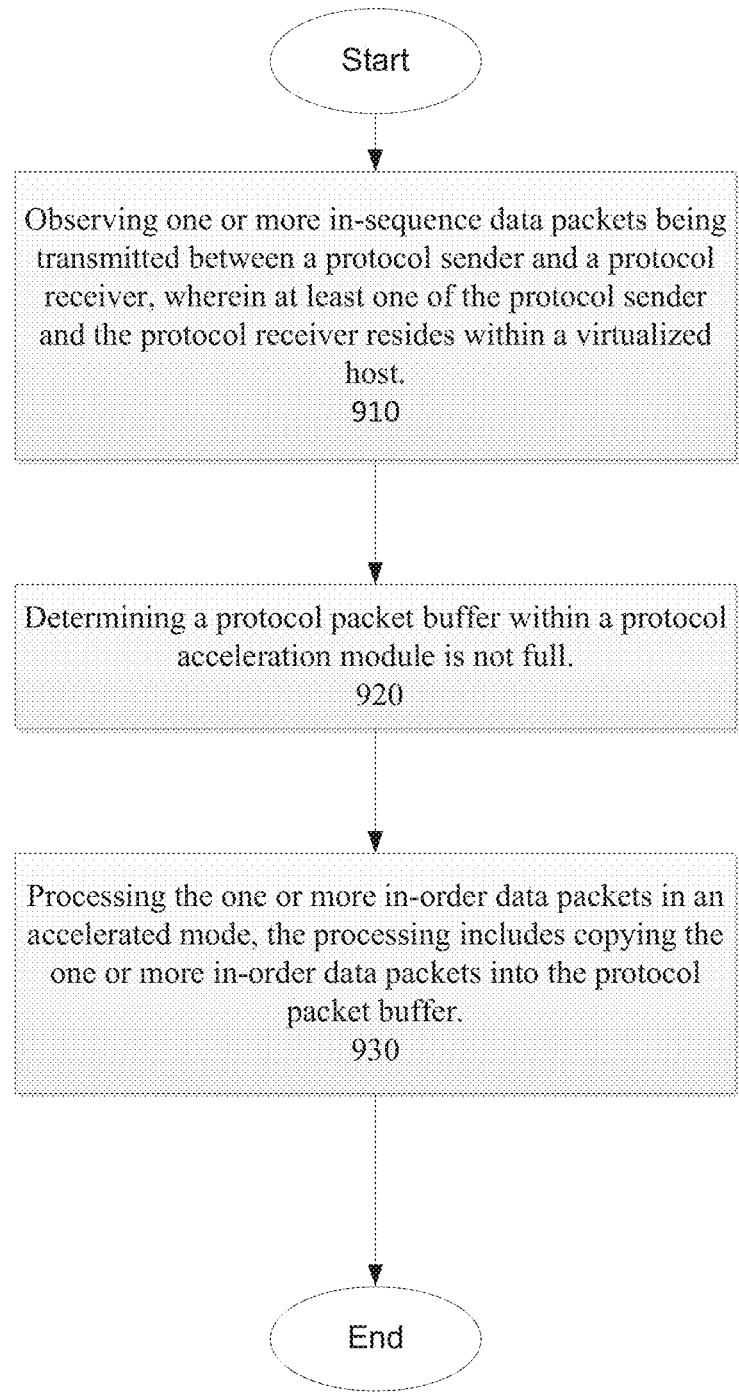
FIG. 9 is a processing flow chart illustrating an example embodiment of a method for accelerated protocol processing between a protocol sender and a protocol receiver.

FIG. 9 is a processing flow chart illustrating an example embodiment of a method for accelerated protocol processing between a protocol sender and a protocol receiver. In an example, method 900 includes observing in-sequence data packets being transmitted between a protocol sender and a protocol receiver where at least one of the protocol sender and the protocol receiver resides within a virtualized host at 910. For alternative embodiments, both the protocol sender and receiver reside within a virtualized host. A determination is made that a protocol packet buffer within a protocol acceleration module is not full at 920. The processing of the in-sequence data packets in an accelerated mode of operation occurs only when the data packets, such as TCP data packets are in-sequence (as inferred from the sequence number) and the protocol packet buffer is not full. A 930, the in-sequence data packets are processed in an accelerated mode of operation and copied into the protocol packet buffer at 930. The in-sequence data packets are copied into the protocol packet buffer before being passed through to the protocol receiver. This allows the protocol accelerator module to implement a packet loss recovery process if an in-sequence data packet is potentially lost.

For various embodiments, the processing the one or more in-sequence data packets includes, an early acknowledgement and packet loss recovery process, while implementing flow control and congestion control processes. An example embodiment uses the protocol acceleration modules to accelerate TCP/IP protocol processing between a TCP sender and a TCP receiver.

Figure 10:
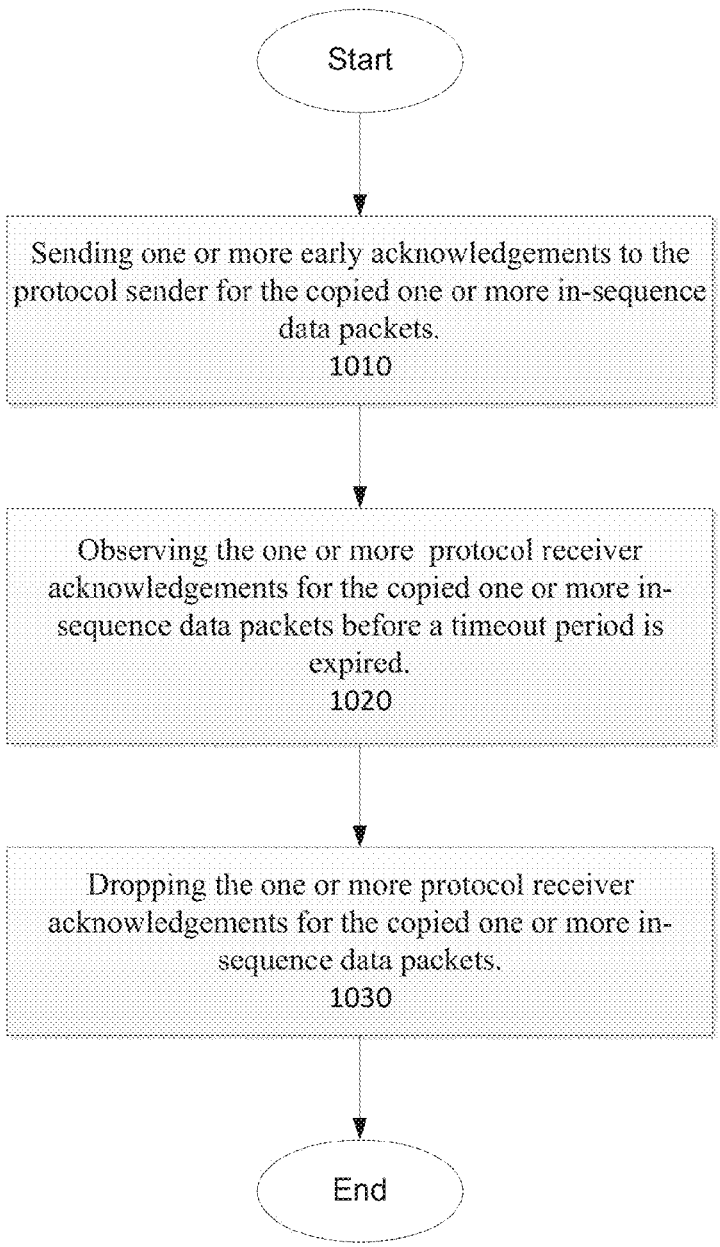
FIG. 10 is a processing flow chart illustrating an example embodiment of a method for early acknowledgement protocol processing.

FIG. 10 is a processing flow chart illustrating an example embodiment of a method for early acknowledgement protocol processing. In an example, method 1000 includes sending one or more early acknowledgements to the protocol sender for the copied one or more in-sequence data packets at 1010; observing the one or more protocol receiver acknowledgements for the copied one or more in-order data packets before a timeout period is expired at 1020; and dropping the one or more protocol receiver acknowledgements for the copied one or more in-sequence data packets at 1030. The early acknowledgement process signals the TCP sender to continue sending data packets before the actual acknowledgement from the TCP receiver (also referred to protocol receiver acknowledgement) to accelerate the sending of data packets and TCP processing.

Figure 11:
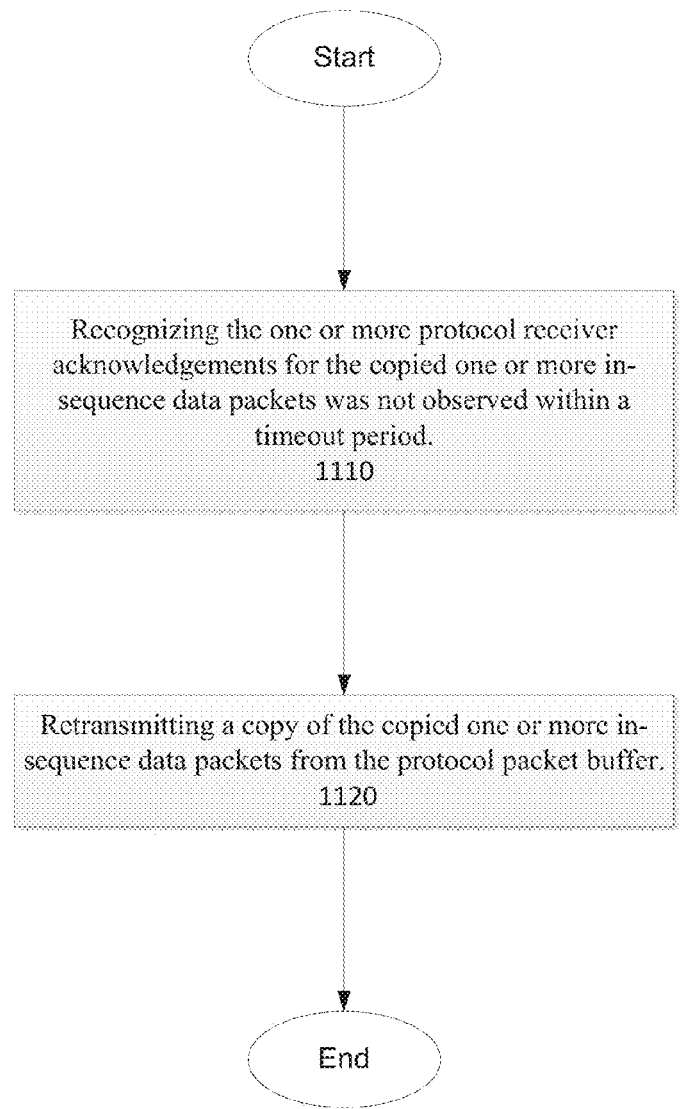
FIG. 11 is a processing flow chart illustrating an example embodiment of a method for packet loss recovery protocol processing.

The protocol acceleration module, such as vTCP module 500, is responsible for ensuring the data packets that it has provided early acknowledgments actually are received by the TCP receiver. FIG. 11 is a processing flow chart illustrating an example embodiment of a method for packet loss recovery protocol processing. In an example, method 1100 includes recognizing the one or more protocol receiver acknowledgements for the copied one or more in-sequence data packets was not observed within a timeout period at 1110; and retransmitting a copy of the copied one or more in-sequence data packets from the protocol packet buffer at 1120.

Figure 12:
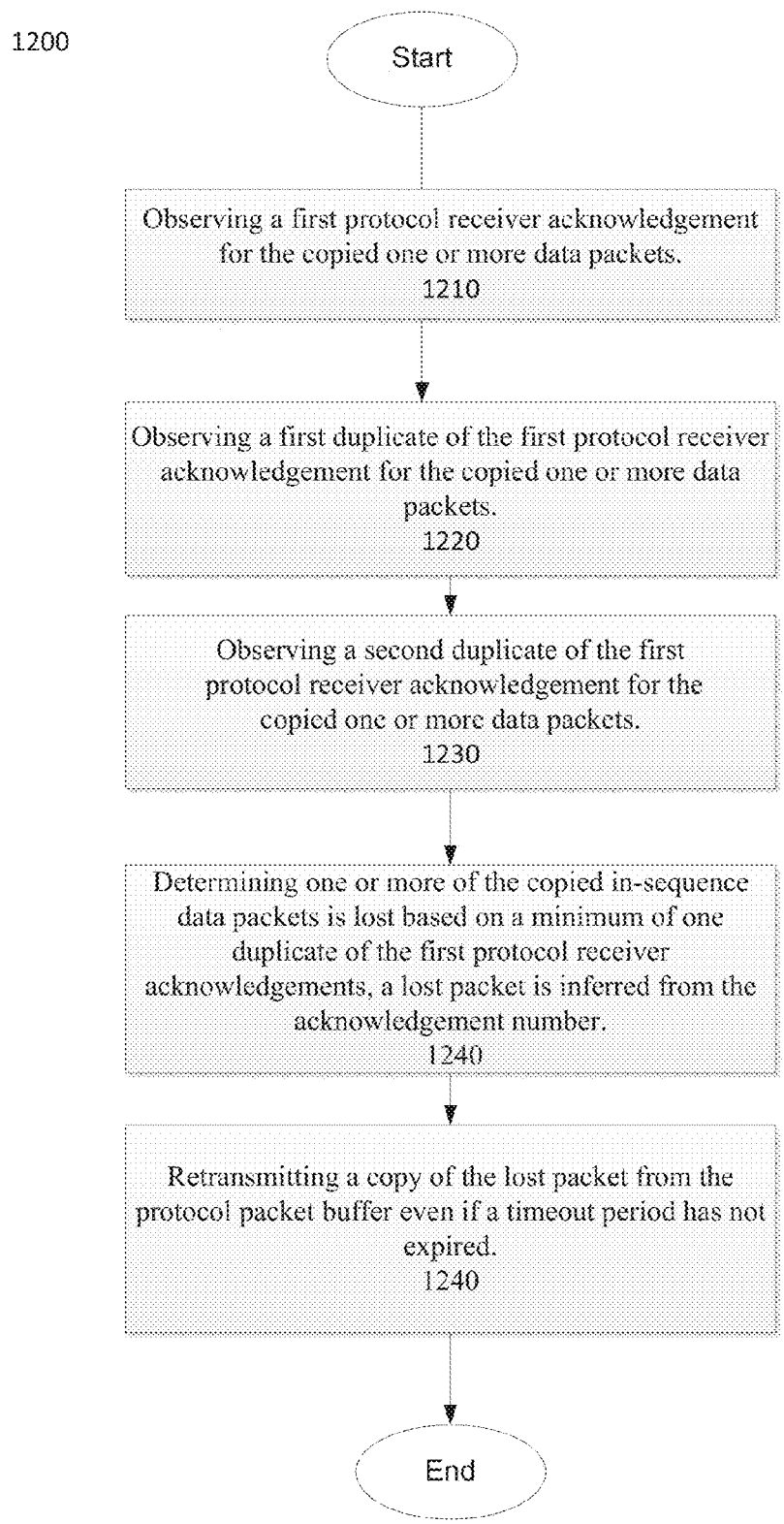
FIG. 12 is a processing flow chart illustrating an example embodiment of a method for packet loss recovery protocol processing for duplicative acknowledgements.

FIG. 12 is a processing flow chart illustrating an alternative embodiment of a method for packet loss recovery protocol processing for duplicate acknowledgments received from the TCP receiver. In an example, method 1200 include observing a first protocol receiver acknowledgement for the copied one or more data packets; observing a first duplicate of the first protocol receiver acknowledgement for the copied one or more data packets at 1210; observing a second duplicate of the first protocol receiver acknowledgement for the copied one or more data packets at 1220; determining one or more of the copied in-sequence data packets is lost based on a minimum of one duplicate of the first protocol receiver acknowledgements, a lost packet is inferred from the acknowledgement number at 1230; and retransmitting a copy of the lost packet from the protocol packet buffer even if a timeout period has not expired at 1240.

For various embodiments, the flow control protocol processing implements a sliding window flow control protocol. For example, when the sliding window flow control protocol is implemented for TCP, the 16 bit window size field in the TCP header is used to specify the number of window size units (e.g., in bytes). This value indicates the amount of additionally received data (in bytes) that a TCP receiver is willing to buffer for the connection, and thus the TCP sender can only send up to that amount of data before it is required to wait for an acknowledgement from the TCP receiver. When a TCP receiver advertises a window size of 0, the TCP sender stops sending data until it receives an updated window size value for the TCP receiver.

Figure 13:
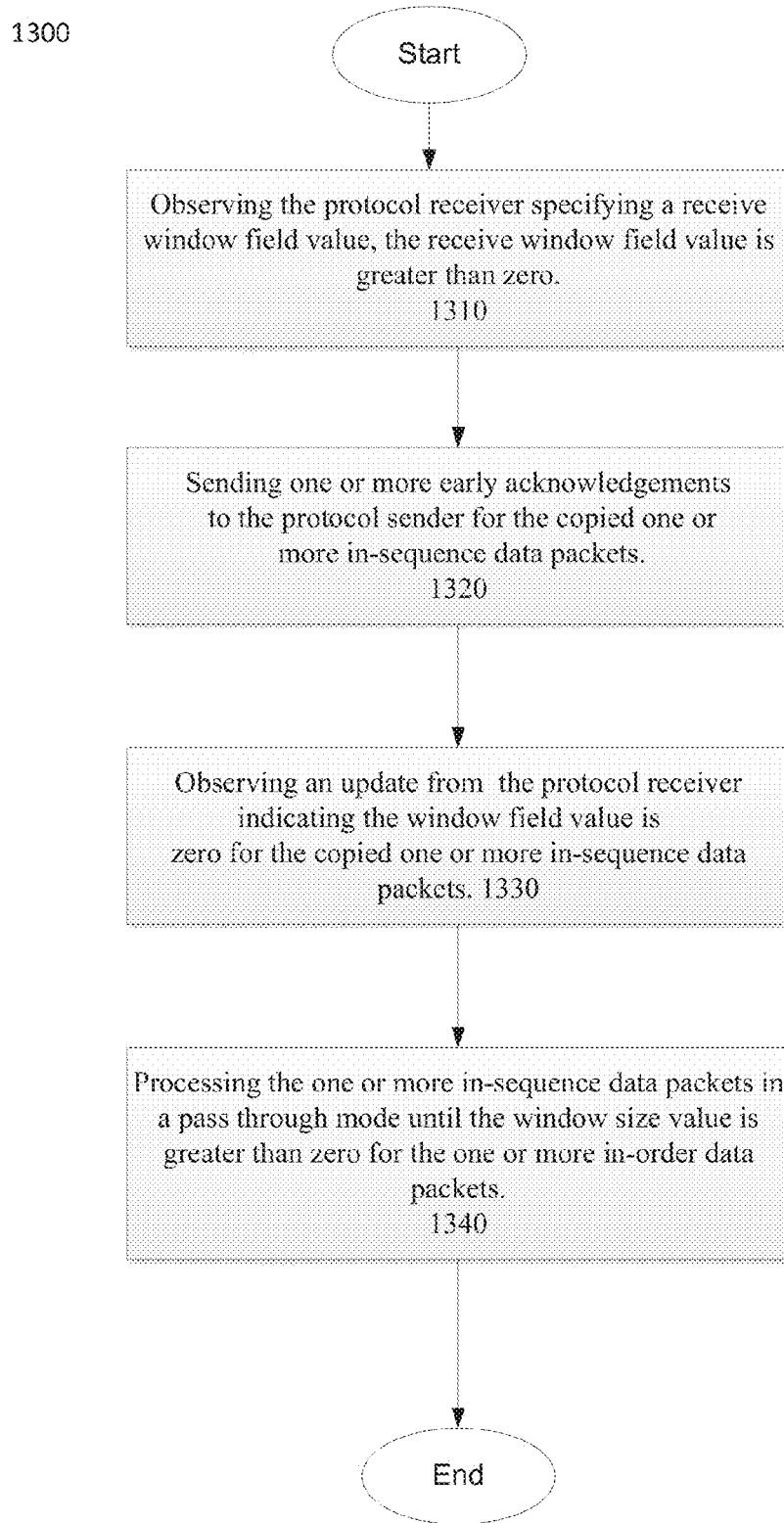
FIG. 13 is a processing flow chart illustrating another example embodiment of a method for flow control protocol processing.

FIG. 13 is a processing flow chart illustrating another example embodiment of a method for flow control protocol processing. In an example, method 1300 includes observing the protocol receiver specifying a receive window field value greater than zero at 1310; sending one or more early acknowledgements to the protocol sender for the copied one or more in-sequence data packets at 1320; observing an update from the protocol receiver indicating the window field value is zero at 1330; processing the one or more in-sequence data packets in a pass through mode until the window size value is greater than at 1340.

Due to network congestion, traffic load balancing, or other unpredictable network behaviors, IP packets can be lost, duplicated, or delivered out-of-order. TCP detects these problems, requests retransmission of lost data, rearranges out-of-order data, and even helps to minimize network congestion. Various embodiment described herein may implement one or more of the following TCP data packet processes described above related to the reliable transfer of TCP data packets with the use of a vTCP module, also referred to as protocol acceleration module.

Figure 8:
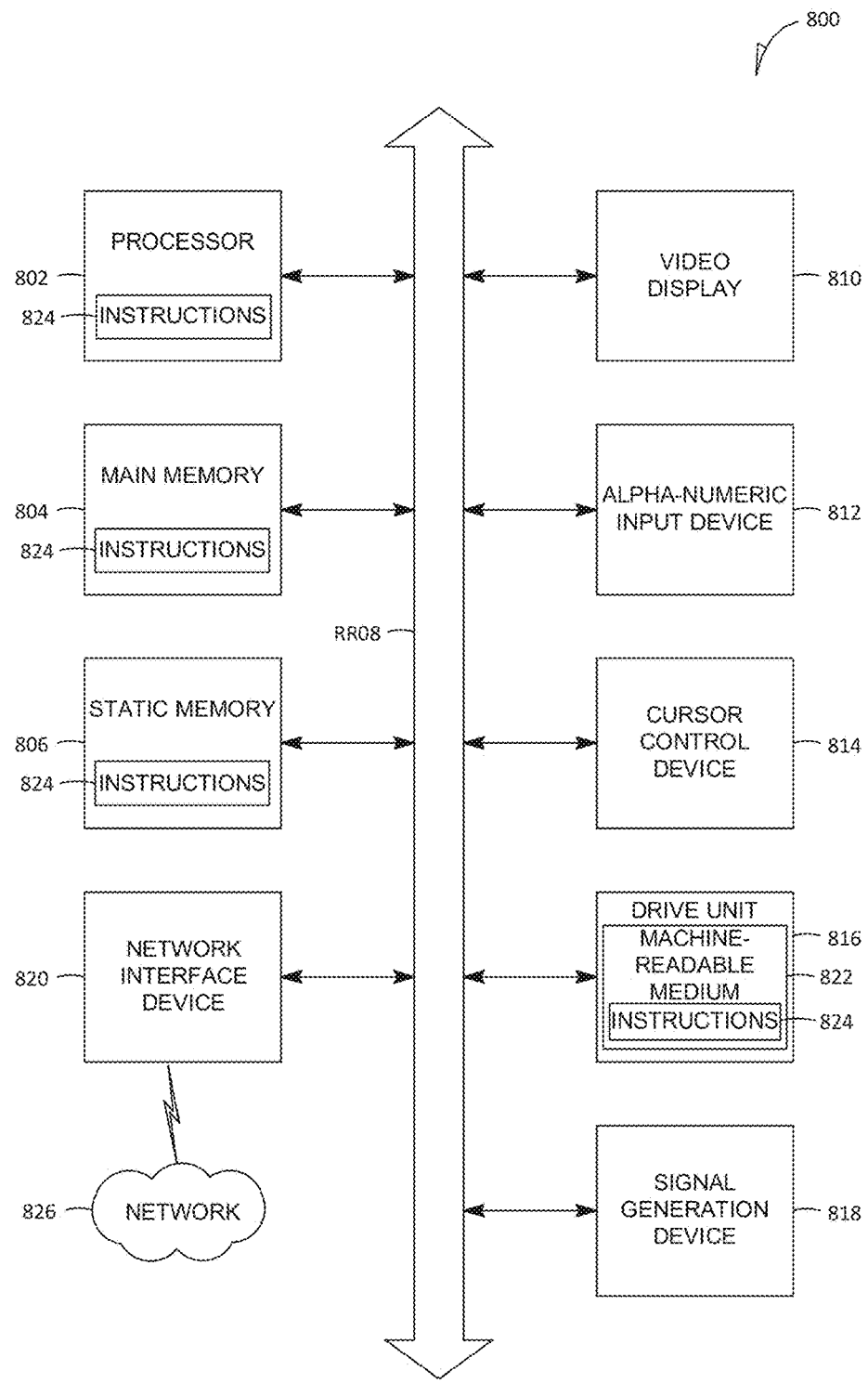
FIG. 8 shows a diagrammatic representation of machine in the example form of a computer system within which a set of instructions when executed may cause the machine to perform any one or more of the methodologies discussed herein.

FIG. 8 shows a diagrammatic representation of a machine in the example form of a computer system 800 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The instructions 824 may also reside, completely or at least partially, within the main memory 804, the static memory 806, and/or within the processor 802 during execution thereof by the computer system 800. The main memory 804 and the processor 802 also may constitute machine-readable media. The instructions 824 may further be transmitted or received over a network 826 via the network interface device 820. While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" shall accordingly be taken to include, but not be limited to, solid-state memories, optical media, and magnetic media.

The various embodiments described herein can enable several benefits and features that would otherwise not be available.

We claim:

1. A method, comprising:
observing in-sequence data packets being transmitted in both directions between a protocol sender and a protocol receiver during a Transport Control Protocol (TCP) connection between the protocol sender and the protocol receiver, wherein at least one of the protocol sender and the protocol receiver resides within a virtualized host executing on a hypervisor of a server;
determining a protocol packet buffer within a protocol acceleration module is not full, wherein the protocol acceleration module is located within the hypervisor; and
processing, by the protocol acceleration module located within the hypervisor, the in-sequence data packets associated with the TCP connection in an accelerated mode, wherein the processing includes copying the in-sequence data packets associated with the TCP connection into the protocol packet buffer when the virtualized host is not scheduled, and further includes an early acknowledgement process.

2. The method of claim 1, wherein the early acknowledgement process includes sending one or more early acknowledgements to the protocol sender for the copied in-sequence data packets.

3. The method of claim 2, wherein the early acknowledgement process further includes:
observing the one or more protocol receiver acknowledgements for the copied one or more in-sequence data packets before a timeout period is expired; and
dropping the one or more protocol receiver acknowledgements for the copied one or more in-sequence data packets.

4. The method of claim 2, wherein the early acknowledgement process further includes a packet loss recovery process.

5. The method of claim 4, wherein the packet loss recovery process includes:
recognizing the one or more protocol receiver acknowledgements for the copied in-sequence data packets were not observed within a timeout period; and
retransmitting a copy of the copied in-sequence data packets from the protocol packet buffer.

6. The method of claim 4, wherein the packet loss recovery process further includes:
observing a first protocol receiver acknowledgement for the copied one or more in-sequence data packets;
observing a first duplicate of the first protocol receiver acknowledgement for the copied one or more data packets;
observing a second duplicate of the first protocol receiver acknowledgement for the copied one or more in-sequence data packets;
determining one or more of the copied in-sequence data packets is lost based on a minimum of one duplicate of the first protocol receiver acknowledgements, a lost packet is inferred from an acknowledgement number from the first protocol receiver acknowledgement; and
retransmitting a copy of the lost packet from the protocol packet buffer even if a timeout period has not expired.

7. The method of claim 1, wherein the processing of the in-sequence data packets in the accelerated mode further includes a flow control process for the in-sequence data packets during the TCP connection.

8. The method of claim 7, wherein the early acknowledgement process further includes:
observing the protocol receiver specifying a window field value greater than zero;
sending one or more early acknowledgements to the protocol sender for the copied in-sequence data packets;
observing an update from the protocol receiver indicating the window field value is zero; and
processing the in-sequence data packets in a pass through mode until the protocol receiver specifies a window size value is greater than zero.

9. The method of claim 1, wherein the processing the in-sequence data packets in the accelerated mode further includes a congestion control process for the in-sequence data packets during the TCP connection.

10. The method of claim 1, wherein the processing the in-sequence data packets in the accelerated mode further includes the processing the in-sequence data packets along a transmit path having the protocol sender residing within a virtualized host, or the processing the in-sequence data packets along a receive path having the protocol receiver residing within a virtualized host.

11. The method of claim 1, wherein the one or more in-sequence data packets are transmitted using a TCP protocol.

12. The method of claim 1, wherein the protocol receiver resides within the virtualized host and wherein the processing the in-sequence data packets in the accelerated mode further comprising copying the in-sequence data packets into a receive side buffer of the protocol packet buffer.

13. The method of claim 1, wherein the protocol sender resides within the virtualized host and wherein the processing the in-sequence data packets in the accelerated mode further comprising copying the in-sequence data packets into a transmit side buffer of the protocol accelerator buffer.

14. The method of claim 1, wherein the processing the in-sequence data packets in the accelerated mode further includes in-band processing the in-sequence data packets in the accelerated mode.

15. A system, comprising:
a virtualized host including a processor; and
a protocol accelerator module, executable by the processor, configured to:
observe one or more in-sequence data packets being transmitted between a protocol sender and a protocol receiver during a Transport Control Protocol (TCP) connection between the protocol sender and the protocol receiver, wherein at least one of the protocol sender and the protocol receiver resides within a virtualized host executing on a hypervisor of a server;
store TCP connection information comprising one or more maximum size segment values for the one or more in-sequence data packets;
determine a protocol packet buffer within a protocol acceleration module is not full, wherein the protocol acceleration module is located within the hypervisor; and
process, based on the TCP connection information comprising the one or more maximum size segment values for the one or more in-sequence data packets, the one or more in-sequence data packets in an accelerated mode during the TCP connection, wherein the processing includes copying the one or more in-sequence data packets associated with the TCP connection into the protocol packet buffer when the virtualized host is not scheduled and sending one or more early acknowledgements to the protocol sender for the copied one or more in-sequence data packets associated with the TCP connection.

16. The system of claim 15, wherein the protocol accelerator module includes protocol processing logic configured to process the one or more in-sequence data packets, the protocol processing logic communicatively coupled to a receive side and a transmit side of the protocol accelerator module, the one or more in-sequence data packets are transmitted away from a network on the receive side and the one or more in-sequence data packets are transmitted towards the network on the transmit side.

17. The system of claim 16, wherein the protocol packet buffer includes a receive side buffer and a transmit side buffer communicatively coupled to the protocol processing logic, the receive side buffer configured to store a copy of the one or more in-sequence data packets on the receive side and the transmit side buffer configured to store a copy of the one or more in-sequence data packets on the receive side during the processing of the in-sequence data packets during the accelerated mode.

18. The system of claim 16, wherein the protocol accelerator modules includes a flow table communicatively coupled to the protocol processing logic, the flow table configured to store status information of the copied one or more in-sequence packets stored within one of the receive side buffer and the transmit side buffer, the status information including a current mode of operation of the protocol accelerator module, the flow table further configured to store location information of the copied one or more in-sequence packets stored within one of the receive side buffer and the transmit side buffer.

19. The system of claim 16, wherein the protocol accelerator modules includes a receive side timer and a transmit side timer communicatively coupled to the protocol processing logic, the receive side and the transmit side timers configured to provide a timeout period for observing one or more receiver acknowledgements for the one or more in-sequence data packets.

20. The system of claim 16, wherein the protocol accelerator module includes a receive side congestion control module and a transmit side congestion control module communicatively coupled to the protocol processing logic.

21. A non-transitory machine-useable medium embodying instructions which, when executed by a machine, cause the machine to:
observe one or more in-sequence data packets being transmitted between a protocol sender and a protocol receiver during a Transport Control Protocol (TCP) session between the protocol sender and the protocol receiver, wherein at least one of the protocol sender and the protocol receiver resides within a virtualized host executing on a hypervisor of a server;
determine a protocol packet buffer within a protocol acceleration module is not full, wherein the protocol acceleration module is located within the hypervisor;
process, by the protocol acceleration module located within the hypervisor, the one or more in-sequence data packets associated with the TCP session in an accelerated mode, wherein the processing includes copying the one or more in-sequence data packets associated with the TCP session into the protocol packet buffer when the virtualized host is not scheduled; and
send one or more early acknowledgements to the protocol sender for the copied one or more in-sequence data packets.

22. The non-transitory machine-useable medium of claim 21, wherein the instructions further configured to:
observe the one or more early acknowledgements for the copied one or more in-sequence data packets before a timeout period is expired; and
drop the one or more early acknowledgements for the copied one or more in-sequence data packets.

23. The non-transitory machine-useable medium of claim 21, wherein the instructions further configured to:
recognize the one or more early acknowledgements for the copied one or more in-sequence data packets was not observed within a timeout period; and
retransmit a copy of the copied one or more in-sequence data packets from the protocol packet buffer.

24. The non-transitory machine-useable medium of claim 21, wherein the instructions further configured to:
observe a first protocol receiver acknowledgement for the copied one or more in-sequence data packets;
observe a first duplicate of the first protocol receiver acknowledgement for the copied one or more in-sequence data packets;
observe a second duplicate of the first protocol receiver acknowledgement for the copied one or more in-sequence data packets;
determine one or more of the copied in-sequence data packets is lost based on a minimum of one duplicate of the first protocol receiver acknowledgements, a lost packet is inferred from the acknowledgement number; and
retransmit a copy of the lost packet from the protocol packet buffer even if a timeout period has not expired.

25. The non-transitory machine-useable medium of claim 21, wherein the instructions further configured to
observe the protocol receiver specifying a receive window field value, the receive window field value is greater than zero;
observe an update from the protocol receiver indicating the window field value is zero for the copied one or more in-sequence data packets; and
process the one or more in-sequence data packets in a pass through mode until the window size value is greater than zero for the one or more in-sequence data packets.

26. The non-transitory machine-useable medium of claim 21, wherein the instructions further configured to perform a congestion control process.

27. The non-transitory machine-usable medium of claim 21, wherein the instructions further configured to perform a flow control process.

28. The non-transitory machine-useable medium of claim 21, wherein the instructions further configured to observe and process one or more TCP in-sequence data packets.

* * * * *